United States Patent
Kamei et al.

(10) Patent No.: US 11,016,366 B2
(45) Date of Patent: May 25, 2021

(54) PRINTER-EQUIPPED IMAGING APPARATUS, OPERATION METHOD OF PRINTER-EQUIPPED IMAGING APPARATUS, PROGRAM, AND RECORDING MEDIUM

(71) Applicant: FUJIFILM Corporation, Tokyo (JP)

(72) Inventors: Keita Kamei, Tokyo (JP); Kazuhisa Horikiri, Tokyo (JP); Hirotoshi Ono, Tokyo (JP); Rena Kamoda, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/706,186

(22) Filed: Dec. 6, 2019

(65) Prior Publication Data

US 2020/0183257 A1    Jun. 11, 2020

Related U.S. Application Data

(63) Continuation of application No. PCT/JP2017/045540, filed on Dec. 19, 2017.

(30) Foreign Application Priority Data

Jun. 23, 2017    (JP) .............................. JP2017-123536

(51) Int. Cl.
  *G03B 17/48*    (2021.01)
  *G10L 15/26*    (2006.01)
  (Continued)

(52) U.S. Cl.
  CPC .............. *G03B 17/48* (2013.01); *B41J 3/445* (2013.01); *G10L 15/22* (2013.01); *G10L 15/26* (2013.01); *G10L 25/51* (2013.01)

(58) Field of Classification Search
  USPC ........................................................ 396/312
  See application file for complete search history.

(56) References Cited

U.S. PATENT DOCUMENTS

| 5,276,472 | A | * | 1/1994 | Bell | ....................... | G03B 17/24 |
| | | | | | | 396/312 |
| 6,931,201 | B2 | * | 8/2005 | Obrador | ............... | G11B 27/105 |
| | | | | | | 386/230 |

(Continued)

FOREIGN PATENT DOCUMENTS

| JP | 3060617 U | 9/1999 |
| JP | 2001-268422 A | 9/2001 |

(Continued)

OTHER PUBLICATIONS

International Search Report issued in PCT/JP2017/045540; dated Mar. 13, 2018.

(Continued)

*Primary Examiner* — Clayton E. LaBalle
*Assistant Examiner* — Warren K Fenwick
(74) *Attorney, Agent, or Firm* — Studebaker & Brackett PC

(57) ABSTRACT

A printer-equipped imaging apparatus capable of giving new pleasure to a user and clearly recording an imaged scene, an operation method of a printer-equipped imaging apparatus, and a program are provided. The printer-equipped imaging apparatus includes an imaging unit 2 that acquires a captured image of a subject, a text generation unit that generates a text based on a sound emitted by the subject or a sound around the subject, a print unit that prints the captured image acquired by the imaging unit and the text generated by the text generation unit, the print unit printing a combined photograph of the captured image and the text, and a print control unit that causes the print unit to print the combined photograph.

15 Claims, 22 Drawing Sheets

(51) Int. Cl.
    *G10L 15/22*     (2006.01)
    *G10L 25/51*     (2013.01)
    *B41J 3/44*     (2006.01)

(56) References Cited

U.S. PATENT DOCUMENTS

| | | | |
|---|---|---|---|
| 7,053,938 B1 * | 5/2006 | Sherry | H04N 5/772 348/231.4 |
| 7,483,061 B2 * | 1/2009 | Fredlund | G03B 31/06 348/231.4 |

FOREIGN PATENT DOCUMENTS

| | | |
|---|---|---|
| JP | 2003-023566 A | 1/2003 |
| JP | 2003-298984 A | 10/2003 |
| JP | 2007-266793 A | 10/2007 |
| JP | 2014-179943 A | 9/2014 |

OTHER PUBLICATIONS

International Preliminary Report on Patentability and Written Opinion issued in PCT/JP2017/045540; dated Dec. 24, 2019.

Kazuhisa Horikiri et al.; "Fujifilm & Fuji Xerox 'instax movie' (2016)"; Axis; Axis inc.; Dec. 29, 2016.

Kazuhisa Horikiri et al.; "Prototype Cheki Movie by Fujifilm Design x Fuji Xerox Design"; Fujifilm Corporation; Jan. 23, 2017; http://design.fujifilm.com/ja/chekimovie/design/.

* cited by examiner

PRINTER-EQUIPPED IMAGING APPARATUS, OPERATION METHOD OF PRINTER-EQUIPPED IMAGING APPARATUS, PROGRAM, AND RECORDING MEDIUM

CROSS-REFERENCE TO RELATED APPLICATIONS

The present application is a Continuation of PCT International Application No. PCT/JP2017/045540 filed on Dec. 19, 2017 claiming priority under 35 U.S.C. § 119(a) to Japanese Patent Application No. 2017-123536 filed on Jun. 23, 2017. Each of the above applications is hereby expressly incorporated by reference, in its entirety, into the present application.

BACKGROUND OF THE INVENTION

1. Field of the invention

The present invention relates to a printer-equipped imaging apparatus, an operation method of a printer-equipped imaging apparatus, a program, and a recording medium and particularly, to a technology for printing a combined photograph composed of a captured image and a text by a printer disposed in a printer-equipped imaging apparatus.

2. Description of the Related Art

In the related art, a printer-equipped imaging apparatus (printer-equipped camera) in which an imaging apparatus and a printer are integrated and a captured image acquired by the imaging apparatus can be printed by the integrated printer is known.

For example, JP2001-268422A discloses a printer-equipped imaging apparatus that can print an image captured by an imaging element on an instant film incorporating a developing treatment liquid.

In addition, in the related art, an expression form in which a captured image and a text related to the captured image are combined is known.

For example, JP2014-179943A discloses a playback apparatus that displays a combination of an image and a text on a display panel. Specifically, a display apparatus that analyses audio data, converts the audio data into text data by performing audio recognition in a case where the audio data is classified as a voice of a person, or selects a corresponding inanimate phonomime from an inanimate phonomime text database in a case where the audio data is classified as a sound other than a voice of a person based on the analysis result, and displays the text data or the inanimate phonomime along with the image is disclosed.

SUMMARY OF THE INVENTION

By seeing an image, a person recalls a certain scene or associates the image with a certain scene. By combining the image with a text related to the image, a person may be capable of more clearly recalling a certain scene or associating the image with a certain scene. That is, the range of expression can be increased by using the image and the text in expression.

Furthermore, the captured image is more conveniently stored by displaying and checking the captured image on a display unit and also printing the captured image and acquiring the captured image as a printed material. In addition, in a case where the captured image is shared between a plurality of persons, the captured image can be more conveniently shared by instantly printing a plurality of sheets of the captured image. Furthermore, nowadays, it is considered that the captured image acquired by a digital camera is only displayed on the display unit, and opportunities of acquiring the captured image as a printed material are decreased. Thus, obtaining the acquired captured image as a printed material can give new pleasure to a user.

The printer-equipped imaging apparatus disclosed in JP:2001-268422A prints only the image captured by the imaging element and does not print a combined photograph composed of the captured image and the text.

The display apparatus disclosed in JP2014-179943A displays the image and the like on the display panel and does not provide the printed material.

The present invention is conceived in view of such matters. An object of the present invention is to provide a printer-equipped imaging apparatus capable of conveniently handling a captured image, giving new pleasure to a user, and clearly recording an imaged scene, an operation method of a printer-equipped imaging apparatus, and a program.

In order to achieve the object, a printer-equipped imaging apparatus according to one aspect of the present invention comprises an imaging unit that acquires a captured image of a subject, a text generation unit that generates a text based on a sound emitted by the subject or a sound around the subject, a print unit that prints the captured image acquired by the imaging unit and the text generated by the text generation unit, the print unit printing a combined photograph of the captured image and the text, and a print control unit that causes the print unit to print the combined photograph.

According to the present aspect, the captured image of the subject is acquired by the imaging unit. The text is generated by the text generation unit based on the sound emitted by the subject or the sound around the subject. The combined photograph composed of the captured image and the text related to the captured image is printed. In addition, according to the present aspect, since the print unit and the print control unit are comprised, the acquired captured image is instantly printed and is acquired as a printed material. Accordingly, in the present aspect, an imaged scene can be clearly recorded, and the captured image is easily handled. A user is given new pleasure.

It is preferable that the print control unit causes the print unit to print the captured image and the text on different pages.

According to the present aspect, the print control unit causes the print unit to print the captured image and the text on different pages. Thus, the printed material of an expression form in which the captured image and the text are printed on different pages can be acquired, and the range of expression can be increased.

It is preferable that the print control unit causes the print unit to print the captured image and the text on the same page.

According to the present aspect, the print control unit causes the print unit to print the captured image and the text on the same page. Thus, the printed material of an expression form in which the captured image and the text are printed on the same page can be acquired, and the range of expression can be increased.

It is preferable that the print control unit causes the print unit to print a plurality of the combined photographs.

According to the present aspect, the print control unit causes the print unit to print the plurality of combined photographs. Accordingly, in the present aspect, the printed material of an expression form based on the plurality of combined photographs can be acquired.

It is preferable that the printer-equipped imaging apparatus further comprises a sound collection unit that acquires the sound emitted by the subject or the sound around the subject, in which the text generation unit generates the text based on the sound acquired by the sound collection unit.

According to the present aspect, the sound emitted by the subject or the sound around the subject is acquired by the sound collection unit, and the text is generated by the text generation unit based on the sound acquired by the sound collection unit. Accordingly, in the present aspect, the sound related to the captured image can be accurately collected, and the text related to the captured image can be correctly generated.

It is preferable that the printer-equipped imaging apparatus further comprises an image analysis unit that performs image analysis on the captured image acquired by the imaging unit, in which the text generation unit generates the text based on a result of the image analysis of the image analysis unit.

According to the present aspect, the image analysis of the captured image acquired by the imaging unit is performed by the image analysis unit, and the text is generated by the text generation unit based on the result of the image analysis of the image analysis unit. Accordingly, in the present aspect, since the printed material of the combined photograph including the text generated based on the result of the image analysis of the captured image can be acquired, the printed material of the combined photograph having a wide range of expression can be acquired.

It is preferable that the text generation unit decides a text size or a text type of the text to be generated and generates the text based on the result of the image analysis of the image analysis unit.

According to the present aspect, the text size or the text type is decided by the text generation unit based on the result of the image analysis of the captured image. Thus, texts of various text sizes or various text types are generated, and the printed material of the combined photograph having a wide range of expression can be acquired.

It is preferable that the printer-equipped imaging apparatus further comprises a storage unit that stores the captured image captured by the imaging unit and the text generated by the text generation unit, in which the print control unit causes the print unit to print the captured image and the text stored in the storage unit.

According to the present aspect, the captured image captured by the imaging unit and the text generated by the text generation unit are stored in the storage unit, and the print control unit causes the print unit to print the captured image and the text stored in the storage unit. Accordingly, in the present aspect, a combined photograph stored in the storage unit can be printed after an elapse of a certain time period. In addition, a plurality of combined photographs stored in the storage unit can be printed at the same time.

It is preferable that the printer-equipped imaging apparatus further comprises a display unit that is disposed in a casing of the printer-equipped imaging apparatus, and a display control unit that displays the text generated by the text generation unit on the display unit, in which the print control unit causes the print unit to print the combined photograph of the text displayed on the display unit and the captured image.

According to the present aspect, the text generated by the text generation unit is displayed on the display unit by the display control unit. Thus, the design of the imaging apparatus is improved. In addition, according to the present aspect, the combined photograph of the text displayed on the display unit and the captured image is printed by the print control unit. Accordingly, in the present aspect, since the text is displayed on the casing of the imaging apparatus, and the displayed text can be acquired as a printed material, the user can be given new pleasure.

It is preferable that the display control unit displays an animation composed of the text generated by the text generation unit on the display unit.

According to the present aspect, the animation composed of the text generated by the text generation unit is displayed on the display unit by the display control unit. Thus, design is improved, and the user can be given new pleasure.

It is preferable that the display control unit displays the animation in which the text displayed on the display unit is moved depending on a print operation of the print unit.

According to the present aspect, the animation in which the text displayed on the display unit is moved is displayed by the display control unit depending on the print operation of the print unit. Thus, design is improved, and the user can be given new pleasure.

It is preferable that the display control unit moves the text in a discharge direction of a printed material discharged from the print unit, and removes the text in response to the discharge of the printed material.

According to the present aspect, by the display control unit, the text is moved in the discharge direction of the printed material discharged from the print unit, and the text is removed in response to the discharge of the printed material. Accordingly, in the present aspect, the text displayed on the display unit is copied on the printed material, and the display of the display unit and the printing are interconnected. Thus, design is improved, and the user can be given new pleasure.

It is preferable that the printer-equipped imaging apparatus further comprises a printed text selection unit that selects the text to be printed by the print unit from the text generated by the text generation unit, in which the print unit prints the text selected by the printed text selection unit.

According to the present aspect, the text to be printed by the print unit is selected by the printed text selection unit from the text generated by the text generation unit. Accordingly, in the present aspect, the combined photograph can be formed by selecting a text appropriate for forming the combined photograph from the text generated by the text generation unit.

It is preferable that the display control unit moves the text in a direction perpendicular to a discharge direction of a printed material of the print unit, and moves only the text selected by the printed text selection unit in the discharge direction of the printed material.

According to the present aspect, by the display control unit, the text is moved in the direction perpendicular to the discharge direction of the printed material of the print unit, and. only the text selected by the printed text selection unit is moved in the discharge direction of the printed material. Accordingly, in the present aspect, design is improved, and the user can be given new pleasure.

It is preferable that the display unit is disposed on at least a front surface of the casing.

According to the present aspect, the display unit is disposed on at least the front surface of the casing. Thus, the design of the front surface of the casing is improved.

It is preferable that in a case where the print unit performs a print operation, the imaging unit stops the acquisition of the captured image.

According to the present aspect, in a case where the print unit performs the print operation, the imaging unit stops the acquisition of the captured image. Thus, erroneous operations can be prevented.

An operation method of a printer-equipped imaging apparatus according to another aspect of the present invention comprises an imaging step of acquiring a captured image of a subject, a text generation step of generating a text based on a sound emitted by the subject or a sound around the subject, and a print control step of causing a print unit that prints the captured image acquired in the imaging step and the text generated in the text generation step to print a combined photograph of the captured image and the text.

A program according to still another aspect of the present invention causes a computer of a printer-equipped imaging apparatus to execute an imaging step of acquiring a captured image of a subject, a text generation step of generating a text based on a sound emitted by the subject or a sound around the subject, and a print control step of causing a print unit that prints the captured image acquired in the imaging step and the text generated in the text generation step to print a combined photograph of the captured image and the text.

According to the present invention, the captured image of the subject is acquired by the imaging unit. The text is generated by the text generation unit based on the sound emitted by the subject or the sound around the subject. The combined photograph composed of the captured image and the text related to the captured image is printed. Thus, the imaged scene can be clearly recorded. In addition, according to the present invention, the print unit and the print control unit are comprised. The acquired captured image is instantly printed and is acquired as a printed material. Thus, the captured image is easily handled, and he user can be given new pleasure.

DESCRIPTION OF THE PREFERRED EMBODIMENTS

Hereinafter, a printer-equipped imaging apparatus, an operation method of a printer-equipped imaging apparatus, and a program according to a preferred embodiment of the present invention will be described in accordance with the appended drawings.

[Exterior of Printer-Equipped Imaging Apparatus]

Figure 1:
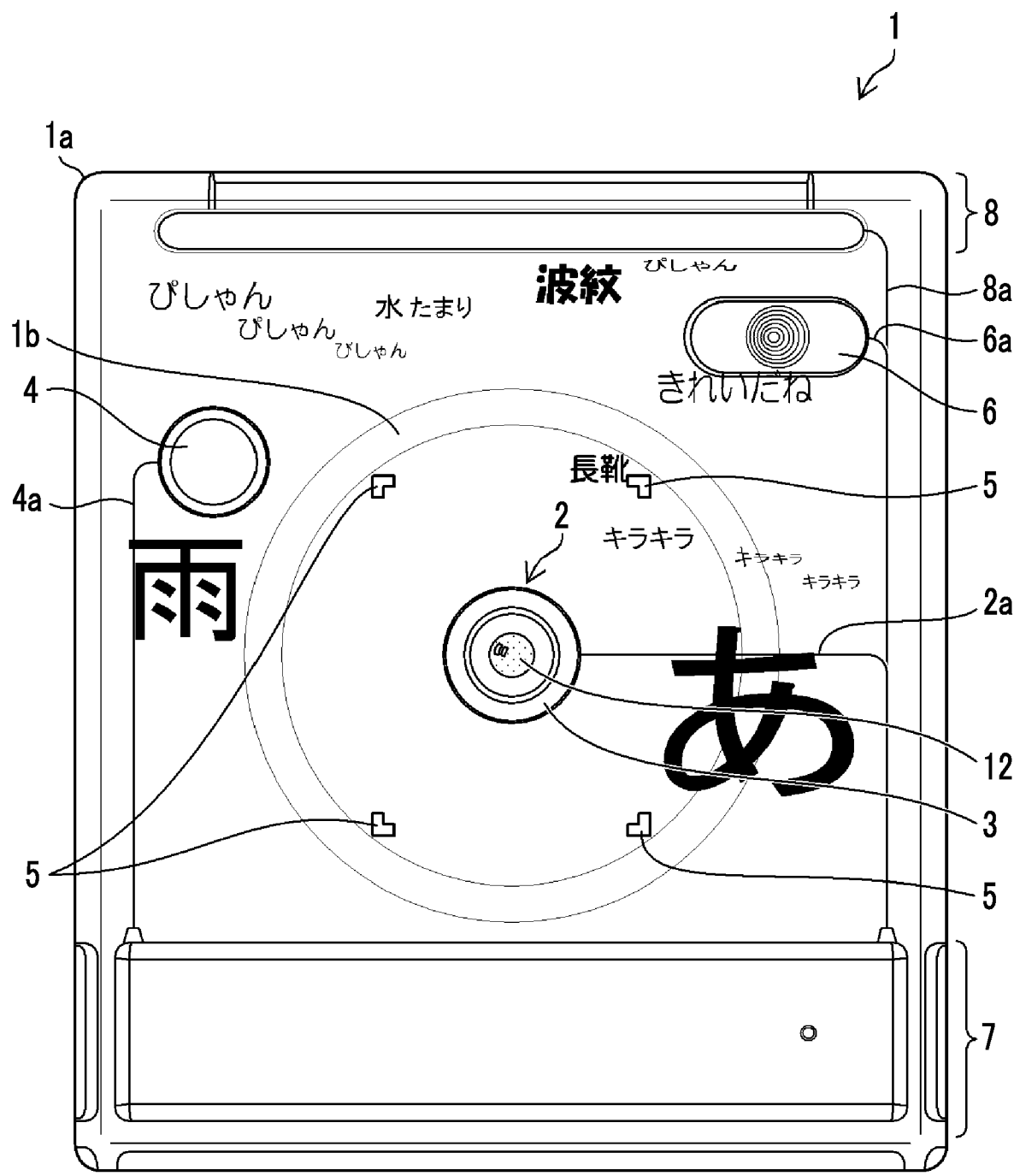
FIG. 1 is a front view illustrating a printer-equipped imaging apparatus according to an embodiment of the present invention.
Figure 2:
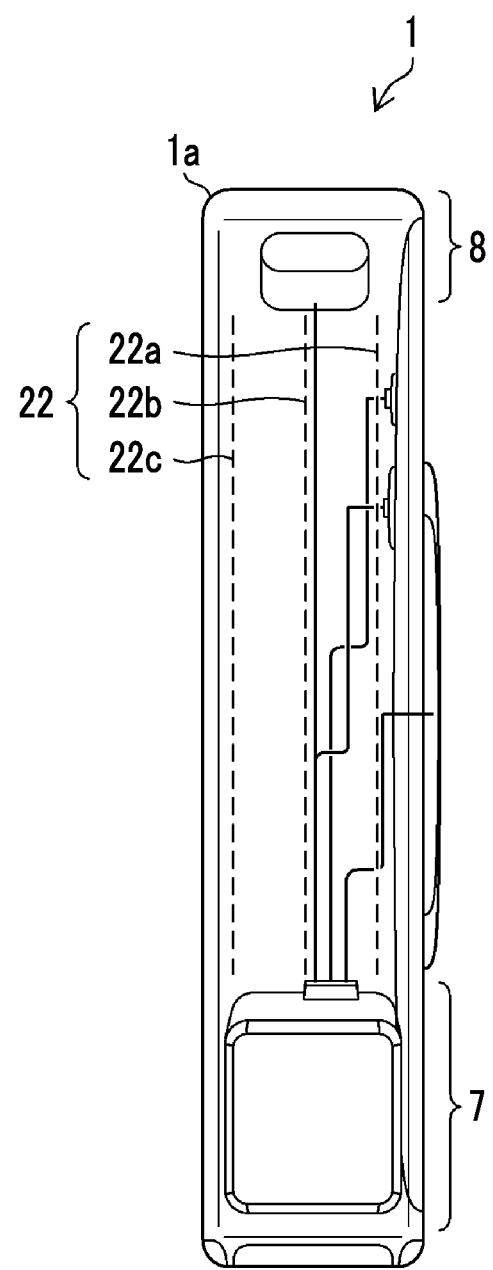
FIG. 2 is a left side view of the printer-equipped imaging apparatus illustrated in FIG. 1.
Figure 3:
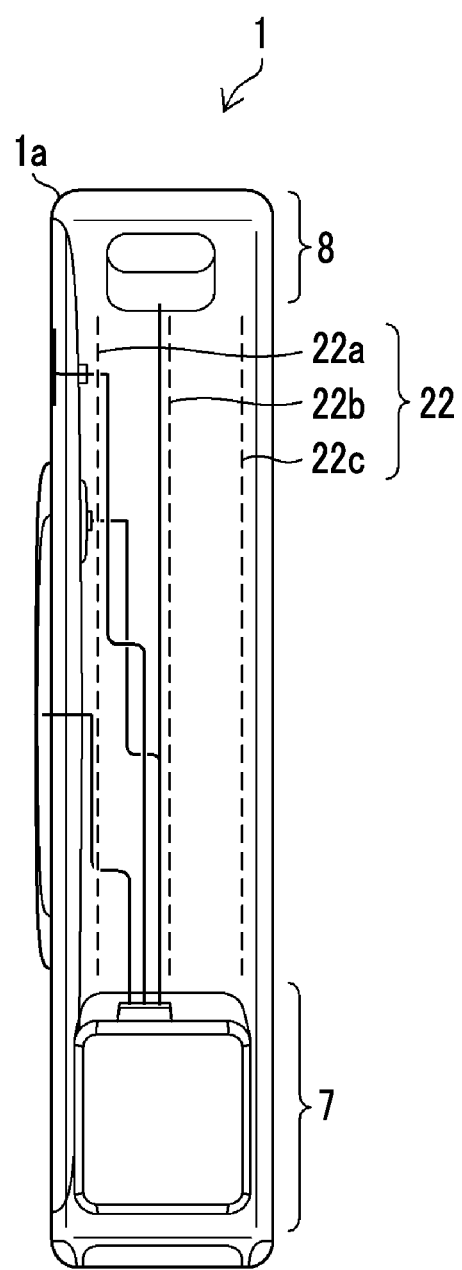
FIG. 3 is a right side view of the printer-equipped imaging apparatus illustrated in FIG. 1.
Figure 4:
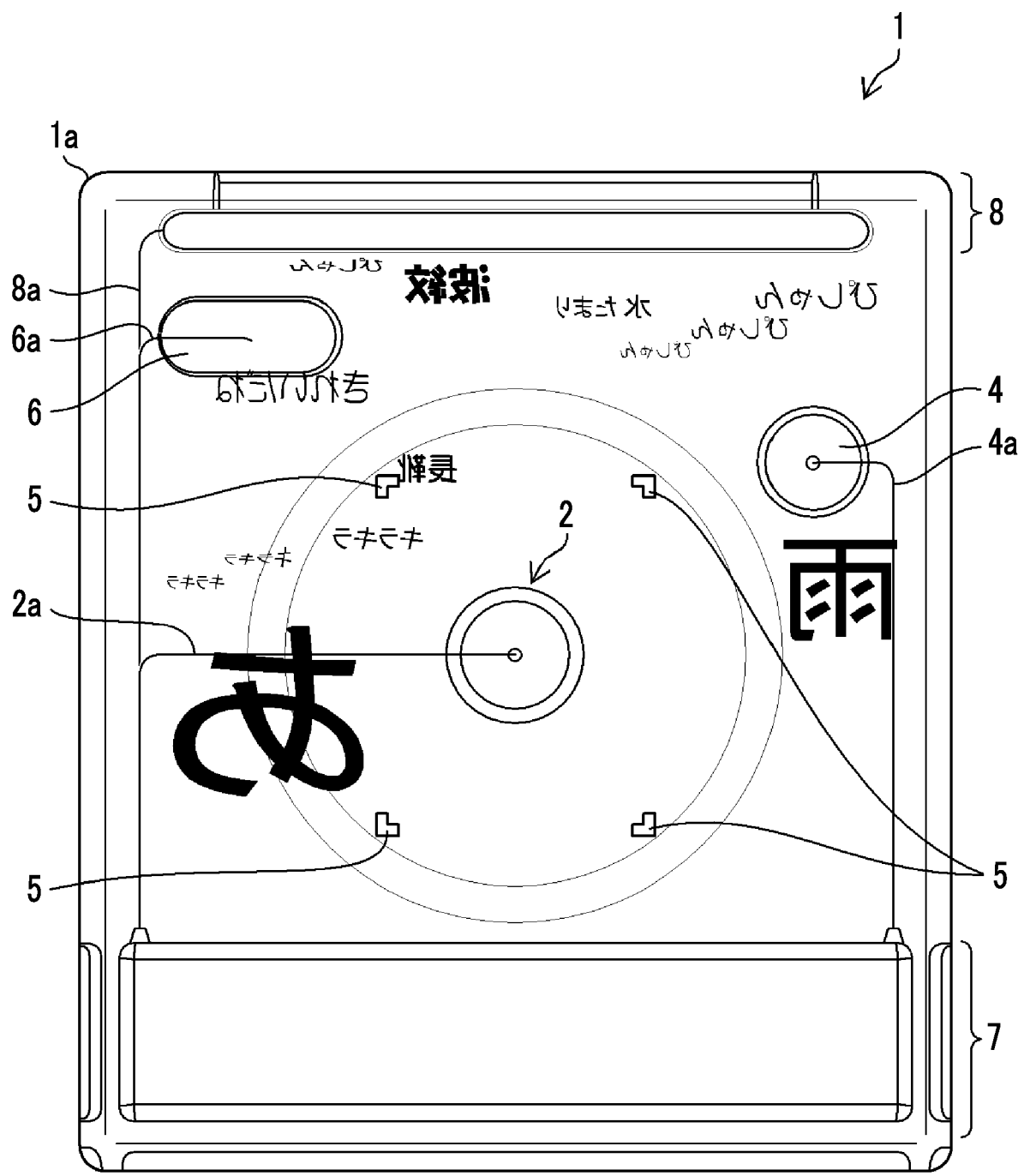
FIG. 4 is a rear view of the printer-equipped imaging apparatus illustrated in FIG. 1.

FIG. 1 to FIG. 4 are respectively a front view, a left side view, a right side view, and a rear view illustrating the printer-equipped imaging apparatus according to the embodiment of the present invention. FIG. 1 and FIG. 4 illustrate a case where a language (text language) representing a text is Japanese.

A printer-equipped imaging apparatus 1 illustrated in FIG. 1 to FIG. 4 receives light passing through a lens by an imaging element and acquires image data of a still picture or a motion picture by converting the light into a digital signal. In the printer-equipped imaging apparatus 1, a digital camera that records the acquired image data in a storage unit 303 (FIG. 6) and a printer that prints an image and the like on print paper based on the image data stored in the storage unit 303 (FIG. 6) are integrated.

The printer-equipped imaging apparatus 1 is mainly formed of a transparent casing 1a, an imaging unit 2, a microphone 3, a transparent display unit 22, a shutter release switch 4, a flash light emission unit 6, a first content 7, a second content 8, and the like.

For example, the transparent casing 1a is formed of a transparent acrylic resin. In the present example, the casing 1a has a rectangular parallelepiped shape in the same manner as the printer-equipped imaging apparatus 1 having a rectangular parallelepiped exterior. In addition, a cylindrical shape protruding portion 1b is formed on the front surface of the casing 1a.

The imaging unit 2 includes an imaging lens 12, the imaging element, and drive units for the imaging lens 12 and the imaging element. The imaging unit 2 corresponds to a small size imaging module that is used in a portable terminal such as a smartphone. It is preferable that the thickness of the imaging unit 2 approximately falls in the cylindrical shape protruding portion 1b of the casing 1a.

The microphone 3 functions as a sound collection unit that collects a sound (audio) emitted by a subject or a sound (including an ambient sound) around the subject. In the present example, the microphone 3 has a ring shape and is arranged around the imaging unit 2 having a circular shape.

The transparent display unit 22 has a display screen (display screen parallel to the front surface or the rear surface of the printer-equipped imaging apparatus 1) that is orthogonal to the imaging direction of the imaging unit 2. The display unit 22 is formed of a plurality (three) of display units 22a, 22b, and 22c that are parallelly arranged at intervals in the casing 1a as illustrated by dotted lines in FIG. 2 and FIG. 3. A transparent liquid crystal display, a transparent inorganic electro-luminescence (EL) display, or a transparent organic EL display can be used as the transparent display unit 22.

The shutter release switch 4 is formed of a so-called stroke type switch of two stages including "half push" and "full push". The shutter release switch 4 functions as an imaging preparation instruction unit and also functions as a recording instruction unit for the image.

The flash light emission unit 6 is a part that uses a xenon tube or a white light emitting diode (LED) as a light emission source and emits flash light as auxiliary light in a case where the subject is dark.

The first content 7 and the second content 8 are component groups that are accommodated in the casing 1a and constitute the printer-equipped imaging apparatus 1. The first content 7 and the second content 8 are formed of component groups other than the imaging unit 2, the microphone 3, the display unit 22, the shutter release switch 4, and the flash light emission unit 6.

The first content 7 mainly includes a component group corresponding to the digital camera in the printer-equipped imaging apparatus 1 and is accommodated in the lower portion of the casing 1a in FIG. 1. The second content 8 mainly includes a component group corresponding to a print unit 301 (printer) (FIG. 6) in the printer-equipped imaging apparatus 1 and is accommodated in the upper portion of the casing 1a. Details of the first content 7 and the second content 8 will be described below The first content 7, the imaging unit 2, and the microphone 3 are electrically connected to each other through a wire 2a. Similarly, the first content 7, the shutter release switch 4, the flash light emission unit 6, and the second content 8 are electrically connected to each other through wires 4a, 6a, and 8a. All or a part of the wires 2a, 4a, 6a, and 8a can be made transparent by using a transparent conductive material.

The casing 1a and the display unit 22 are transparent. Thus, the printer-equipped imaging apparatus 1 is transparent from an ocular side to an objective side except for a part in which the imaging unit 2, the microphone 3, the shutter release switch 4, the flash light emission unit 6, the first content 7, and the second content 8 are accommodated. That is, the opposite side can he seen through the printer-equipped imaging apparatus 1.

It is preferable that the area of half or more of the projection area area represented in FIG. 1) of the printer-equipped imaging apparatus 1 in the imaging direction of the imaging unit 2 is transparent from the ocular side to the objective side. In addition, it is preferable that a content is not accommodated in the center part of the casing 1a except for the imaging unit 2. In the present example, the first content 7 and the second content 8 are accommodated in the lower portion and the upper portion of the casing 1a, respectively.

A finder frame 5 centered at the imaging unit 2 is disposed by printing, carving, or the like in the transparent casing 1a. It is preferable that based on the distance between the printer-equipped imaging apparatus 1 and a face and the focal length of the imaging lens at the time of orienting the printer-equipped imaging apparatus 1 for deciding composition, the size of the finder frame 5 is decided such that a range seen through the finder frame 5 is an imaged range.

According to the finder frame 5, the imaging unit 2 is positioned at the center of the finder frame 5. Thus, the center of the field of view seen through the finder frame 5 matches the center of the imaging range imaged by the imaging unit 2, and parallax does not occur.

The finder frame 5 of the present example is formed of markers disposed at the four corners of a rectangle indicating the imaging range. However, the shape of the finder frame is not limited to this embodiment. Various shapes can be applied.

While illustration is not provided in FIG. 1 to FIG. 4, a guide unit that guides the print paper during transport of the print paper from the first content 7 to the second content 8 is disposed in the casing 1a. The guide unit can be configured as a gap corresponding to the width and the thickness of the print paper. A guide roller or the like may be further arranged.

[Schematic Internal Configuration of Printer-Equipped Imaging Apparatus]

Figure 5:
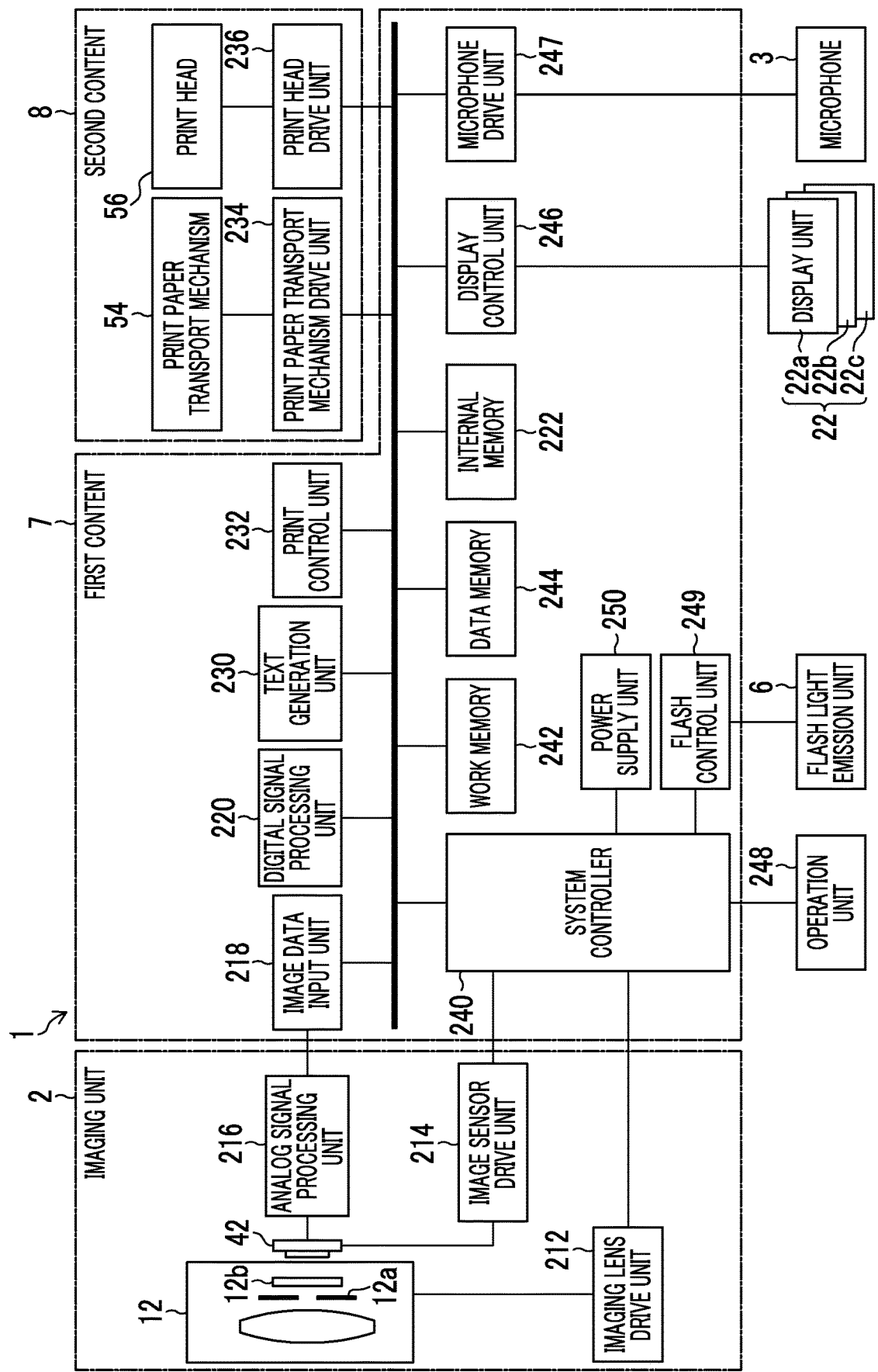
FIG. 5 is a block diagram illustrating a schematic internal configuration of the printer-equipped imaging apparatus illustrated in FIG. 1.

FIG. 5 is a block diagram illustrating a schematic internal configuration of the printer-equipped imaging apparatus 1 illustrated in FIG. 1 and the like.

As described above, the printer-equipped imaging apparatus 1 is configured to comprise the imaging unit 2, the microphone 3, an operation unit 248 including the shutter release switch 4, the flash light emission unit 6, the first content 7, and the second content 8.

<Imaging Unit>

The imaging unit 2 is formed of the imaging lens 12, an imaging lens drive unit 212, an image sensor 42, an image sensor drive unit 214, and an analog signal processing unit 216.

The imaging lens 12 is composed of a plurality of lenses including a focus lens. In FIG. 5, only one lens is illustrated for simplification. The focal point of the imaging lens 12 is adjusted by moving the focus lens forward and rearward along an optical axis by the imaging lens drive unit 212.

A stop 18a and a shutter 18b are comprised in the imaging lens 12. The intensity of light passing through the imaging lens 12 is adjusted by the stop 12a. Light passing through the imaging lens 12 is blocked by the shutter 18b.

The image sensor 42 is formed of a two-dimensional solid-state imaging element such as a charge coupled device (CCD) image sensor or a complementary metal oxide semiconductor (CMOS) image sensor.

The imaging lens drive unit 212 is drive means for the imaging lens 12. The imaging lens drive unit 212 drives the focus lens, the stop 12a, and the shutter 18b. The imaging lens drive unit 212 drives the imaging lens 12 under control of a system controller 240.

The image sensor drive unit 214 is drive means for the image sensor 42. The image sensor drive unit 214 drives the image sensor 42 and controls reading out of an image signal from the image sensor 42 under control of the system controller 240. In addition, the image sensor drive unit 214 has an electronic shutter function of starting exposure by simultaneously discharging (resetting at the same time) electric charges accumulated in each pixel of the image sensor 42 based on an electronic shutter control signal from the system controller 240.

The analog signal processing unit 216 performs various analog signal processing on an analog image signal obtained by imaging the subject by the image sensor 42, The analog. signal processing unit 216 is configured to include a sampling hold circuit, a color separation circuit, an automatic gain control (AGC) circuit, an analog/digital (A/D) converter, and the like. The AGC circuit functions as a sensitivity adjustment unit that adjusts sensitivity (International Organization for Standardization (ISO) sensitivity) at the time of imaging. The AGC circuit adjusts the gain of an amplifier amplifying the input image signal and sets the signal level of the image signal to fall in an appropriate range.

The A/D converter converts the analog image signal into a digital image signal. In a case where the image sensor 42 is a CMOS type image sensor, the analog signal processing unit 216 including the A/D converter is mostly incorporated in the CMOS type image sensor. In a case where the print unit 301 performs a print operation, the imaging unit 2 may stop the acquisition of a captured image. In this case, the imaging unit 2 continues capturing a live view image.

<First Content>

The first content 7 includes an image data input unit 218, a digital signal processing unit 220, an internal memory 222, a text generation unit 230, a print control unit 232, the system controller 240, a work memory 242, a data memory 244, a display control unit 246, a microphone drive unit 247, a flash control unit 249, and a power supply unit 250.

The image data input unit 218 acquires the digital image signal output from the analog signal processing unit 216 under control of the system controller 240. The acquired image data corresponding to one sheet is stored in the work memory 242.

The system controller 240 is a control unit that controls the whole printer-equipped imaging apparatus 1. The system controller 240 is formed of a computer and provides various functions by executing a predetermined program.

Figure 10:
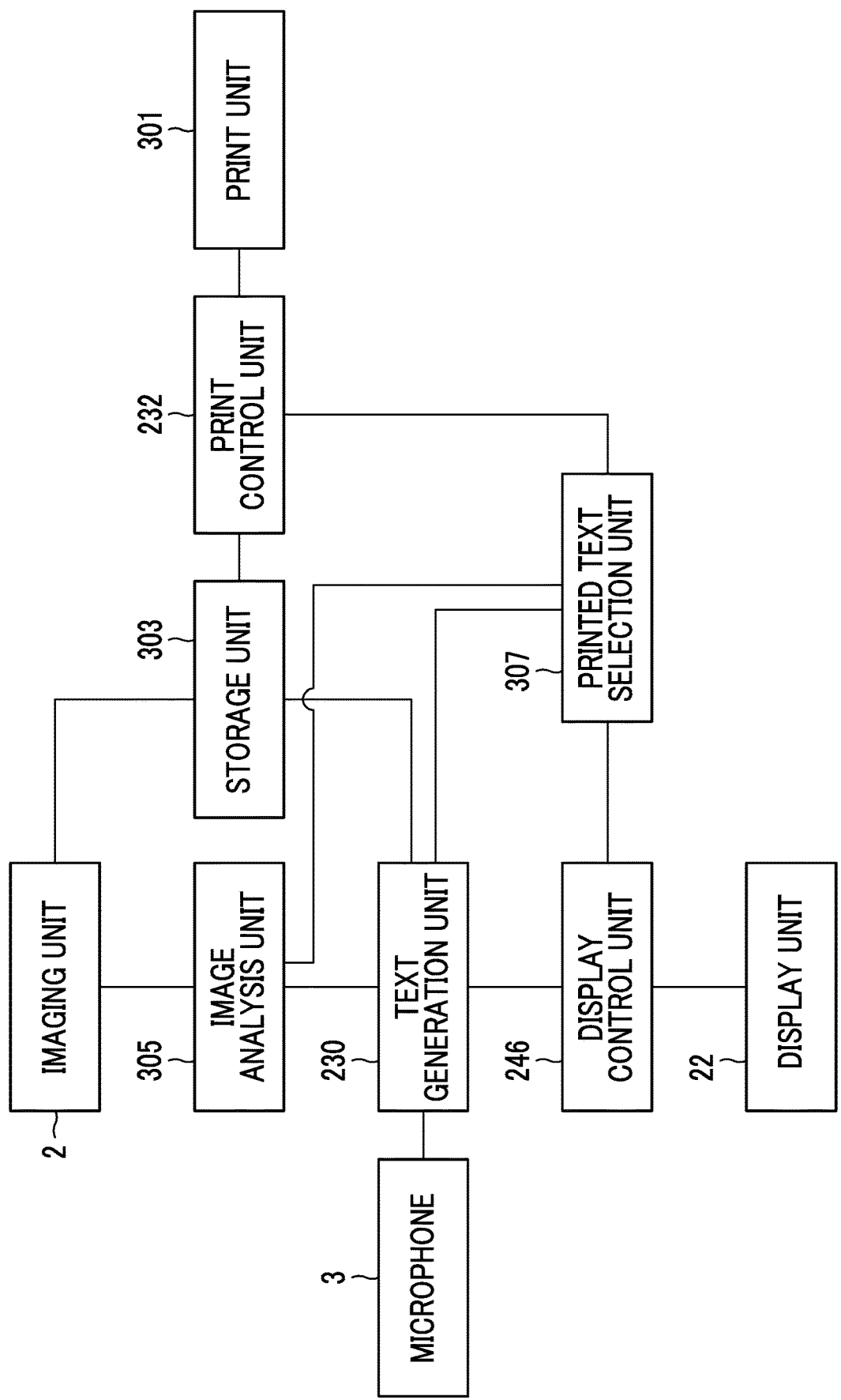
FIG. 10 is a function block diagram of a second embodiment.

In the printer-equipped imaging apparatus 1 of the present embodiment, the system controller 240 has a function as an image analysis unit 305 (FIG. 10). Furthermore, the system controller 240 may have functions as the text generation unit 230, the print control unit 232, and the display control unit 246.

The digital signal processing unit 220 performs necessary signal processing such as a demosaicing process, white balance correction, gamma correction, and contour correction on the image data acquired in the work memory 242 and generates predetermined image data that includes brightness data (Y data) and color difference data (Cr and Cb data).

The internal memory 222 is one example of an image storage unit and stores the image obtained by imaging. The internal memory 222 is formed of a non-volatile memory such as an electrically erasable programmable read only memory (EEPROM).

The text generation unit 230 is a part that converts a sound into a text based on the sound (audio) that is emitted from the subject or the like and is acquired through the microphone 3 and the microphone drive unit 247, and sound data that indicates the sound (ambient sound) around the subject. It is preferable that the audio is converted into a text corresponding to the language of the audio. The ambient sound is mainly converted into an inanimate phonomime.

In addition, the text generation unit 230 generates a text based on the result of image analysis in the image analysis unit 305 (FIG. 10) that performs the image analysis on the captured image acquired by the imaging unit 2. For example, the image analysis unit 305 extracts an object (a rose, an umbrella, a manhole, a landmark, or the like) in the captured image, and the text generation unit 230 generates a text indicating the extracted object. In addition, the image analysis unit 305 analyzes a scene (scene such as a state where the subject jumps, strong wind, or sea spray) from the captured image (including the motion picture), and the text generation unit 230 generates a text (phenomime) indicating the analyzed scene.

Furthermore, it is preferable that the system controller 240 has a function as a language selection unit (not illustrated). For example, in a case where the text generation unit 230 generates the text based on the sound data, the language selection unit may select the language (text language) representing the text by automatically determining the language (audio language) of the sound data. In addition, for example, the language selection unit may display a language selection menu including a plurality of languages (for example, Japanese. English, Spanish, Portuguese, French, and. German) on the display unit 22 by operating a menu button included in the operation unit 248 by a user, and select the text language based on an operation of selecting a desired language by the user. In this case, the text generation unit 230 generates the text based on the sound data and the text based on the result of the image analysis using the language selected by the language selection unit.

The print control unit 232 generates print image data based on the captured image to be printed by the print unit 301 and print image data based on the text generated by the text generation unit 230, outputs the generated print image data to the print unit 301, and causes the print unit 301 to print a combined photograph in which the image and the text are combined. Details of printing of the combined photograph will be described below.

The work memory 242 is a memory for work. For example, the work memory 242 is formed of a synchronous dynamic random access memory (SDRAM). The data memory 244 is a memory that stores a control program, various data necessary for control, and the like. The data memory 244 is formed of a non-volatile memory such as an EEPROM.

The display control unit 246 is a part that generates display data for displaying the text on the display unit 22 (22a, 22b, and 22c) based on the text generated by the text generation unit 230. Particularly, the display control unit 246 generates the display data indicating an animation (animation in which the text moves) composed of the text. For example, the display data indicating an animation in which the text generated by the text generation unit 230 moves from one end to the other end of the display screen of the display unit 22 is generated.

By outputting the display data indicating the animation to the display unit 22, the animation in which the text flows can be displayed on the display unit 22.

The display control unit 246 of the present example displays the text generated by the text generation unit 230 on the display unit 22. It is further preferable that the print unit 301 displays the print image to be output as a prim on the display unit 22 such that the print image can be checked in advance.

In the present example, the finder frame 5 is disposed in the transparent casing 1a. Alternatively, the display control unit 246 may display the same finder frame as the finder frame 5 on the display unit 22.

The microphone drive unit 247 amplifies the audio signal indicating the audio or the ambient sound collected by the microphone 3, converts the audio signal into a digital signal, and transmits the digital signal to the text generation unit 230.

For example, the flash control unit 249 performs flash control based on a through the lens (TTL) automatic light adjustment method. Thus, the flash control unit 249 has a function of adjusting the emission intensity (guide number) of flash light emitted from the flash light emission unit 6. That is, the flash control unit 249 causes the flash light emission unit 6 to emit light in synchronization with a flash imaging instruction from the system controller 240 and starts measuring reflected light (including ambient light) that is incident through the imaging lens 12. In a case where a light measurement value reaches a reference exposure value, the flash control unit 249 stops the emission of flash light from the flash light emission unit 6.

The power supply unit 250 supplies power to each unit under control of the system controller 240. The power supply unit 250 comprises a battery as a power supply and a power supply circuit.

The operation unit 248 includes the shutter release switch 4. Besides, the operation unit 248 may include a menu button, a command dial, a multifunction cross key, a power button, and the like. In addition, the operation unit 248 may be formed of a transparent touch panel arranged on the rear surface of the casing 1a, and the display unit 22 displaying icons indicating various switches.

<Second Content>

The second content 8 is a part mainly corresponding to the print unit 301 in the printer-equipped imaging apparatus 1. The second content 8 includes a print paper transport mechanism 54, a print head 56, a print paper transport mechanism drive unit 234, and a print head drive unit 236.

For example, the print unit 301 of the present example is a TA printer that employs a thermo autochrome (TA) method as a printing method. The print unit 301 colorizes TA paper (hereinafter, referred to as "print paper") having colorizing layers of cyan (C), magenta (M), and yellow (Y) using heat and fixes the colorization by irradiation of light having a predetermined wavelength. The print unit 301 includes the print paper transport mechanism 54 and the print paper transport mechanism drive unit 234 that transport the print paper, the print head 56 that functions as a thermal head, the print head drive unit 236, a fixing lamp, and the like.

In a case where a color captured image is printed on the print paper, the print control unit 232 generates signals (a C signal, an M signal, and a Y signal) of C, M, and Y that are complementary colors of three primary colors as the print image data based on the captured image. The print control unit 232 transports the print paper, controls the print head 56 based on the Y signal, colorizes the yellow layer of the print paper, and then, fixes the colorization of yellow by the fixing lamp. Colorization of the magenta layer and the cyan layer of the print paper is performed in the same manner based on the M signal and the C signal. Accordingly, the color captured image is printed on the print paper.

The print paper is a long print medium that is wound in a roll shape and accommodated in a cartridge, not illustrated. The cartridge is accommodated in the casing 1a as a part of the first content 7.

The first content 7 includes a print paper dispensing mechanism, not illustrated, that rotates the shaft of the cartridge and dispenses the print paper from the cartridge. In a case where the tip end of the print paper dispensed from the cartridge reaches the print paper transport mechanism 54 (for example, between a capstan roller and a pinch roller), the print paper is transported by the print paper transport mechanism 54, and the captured image and the text are printed on the print paper by the print head 56. Accordingly, a long photo print of the combined photograph in which the image and the text are combined is obtained from a discharge port disposed on the ceiling (upper surface) of the casing 1a.

While the print unit of the embodiment is a TA printer, the print unit is not for limitation purposes. The print unit may be a printer of other types such as a thermal printer and an ink jet printer.

First Embodiment

Figure 6:
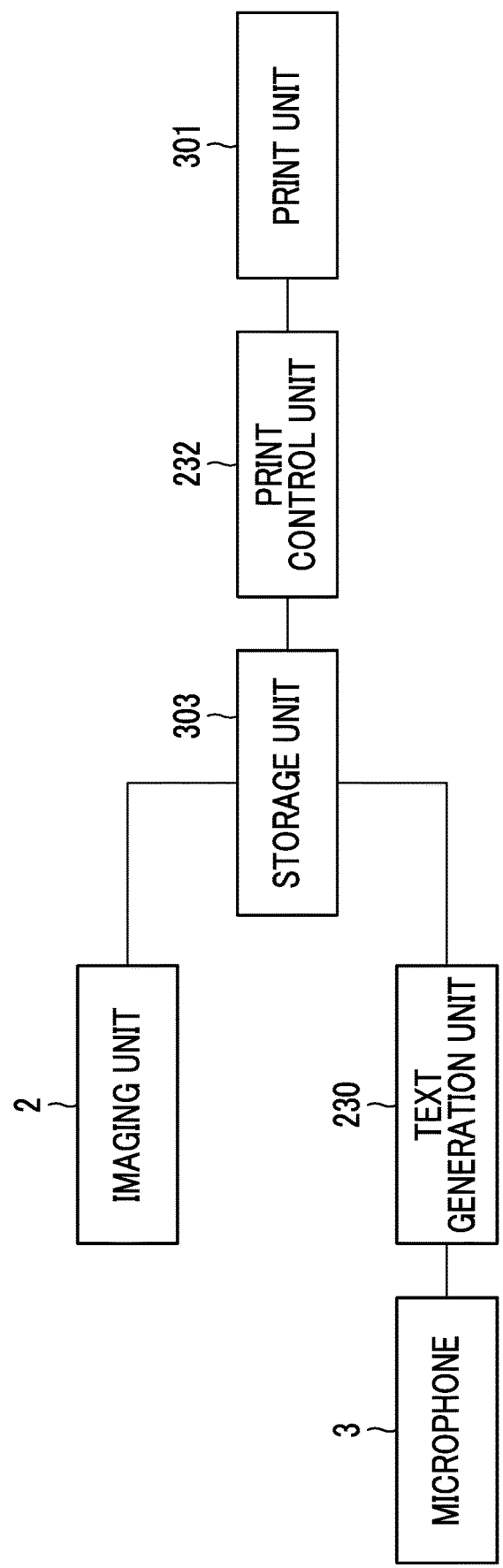
FIG. 6 is a function block diagram of a first embodiment.

Next, a first embodiment of the present invention will be described. FIG. 6 is a diagram illustrating a function block diagram of the present embodiment. Block diagrams already described in FIG. 5 are designated by the same numbers.

The present embodiment is configured with the imaging unit 2, the microphone 3, the text generation unit 230, the storage unit 303, the print control unit 232, and the print unit 301.

The imaging unit 2 acquires the captured image of the subject. The imaging unit 2 acquires the captured image based on an instruction from the shutter release switch 4. In addition, the imaging unit 2 captures the live view image at all times in a state where the power supply of the printer-equipped imaging apparatus 1 is switched ON. That is, the imaging unit 2 continues acquiring the live view image in an imaging preparation state and acquires the captured image in response to the instruction from the shutter release switch 4.

The microphone 3 acquires the sound emitted by the subject or the sound around the subject. The microphone 3 collects the sound at all times in a state where the power supply of the printer-equipped imaging apparatus 1 is switched ON. In addition, the microphone 3 may collect the sound based on an instruction from the shutter release switch 4. Data related to the sound collected by the microphone 3 is input into the text generation unit 230.

The text generation unit 230 generates the text based on the sound emitted by the subject or the sound around the subject. Specifically, the text generation unit 230 analyzes the data related to the sound input from the microphone 3 and generates the text related to the analyzed sound. The text generation of the text generation unit 230 is performed using a well-known technology. For example, in the data memory 244, the text generation unit 230 may store table data in which the sound and the text corresponding to the sound are stored in association with each other, and generate the text based on the table data. In addition, for example, the text generation unit 230 may generate the text based on a well-known program that converts audio into a text. Furthermore, the text generation unit 230 may generate the text from the input data related to the sound using a well-known artificial intelligence (AI) technology. Furthermore, the text generation unit 230 can generate texts of various colors. For example, the text generation unit 230 can generate texts of various colors such as "black", "red", "green", and "blue".

For example, the storage unit 303 is implemented by the internal memory 222. The storage unit 303 stores the captured image captured by the imaging unit 2 and the text generated by the text generation unit 230. The storage unit 303 may store the captured image and the text in the form of a combined photograph or may individually store the captured image and the text. Each time the captured image is acquired, the printer-equipped imaging apparatus 1 may print the combined photograph or may temporarily store the combined photograph in the storage unit 303 and print the combined photograph later.

The print control unit 232 generates an image of the combined photograph of the captured image and the text and causes the print unit 301 to print the combined photograph. The combined photograph in the present application is composed of an image and a text related to the image. The combined photograph can express one scene such as one scene of a video by employing an expression form of the image and the text and can cause a person seeing the combined photograph to recall a story by continuously arranging the combined photographs.

The print unit 301 is implemented in the second content 8. Specifically, the print unit 301 is implemented by the print paper transport mechanism 54, the print paper transport mechanism drive unit 234, the print head 56, and the print head drive unit 236. The print unit 301 prints the combined photograph under control of the print control unit 232.

Figure 7:
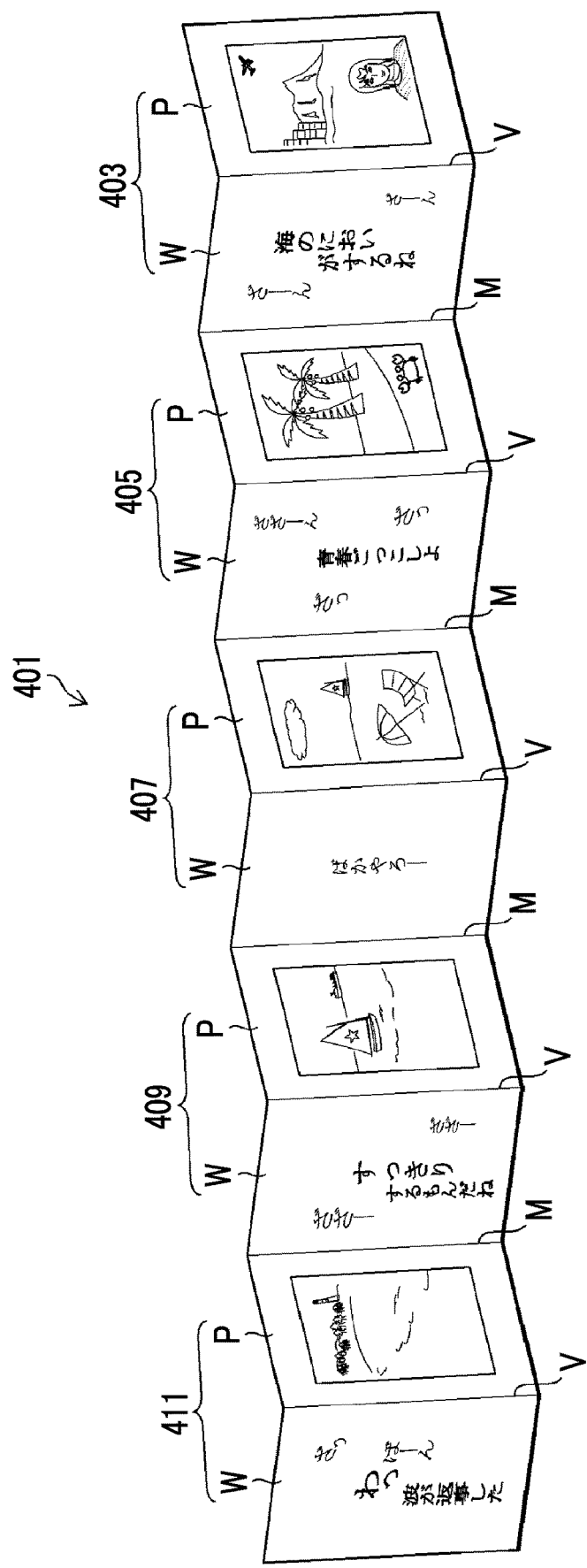
FIG. 7 is a diagram illustrating an example of a printed material.

FIG. 7 is a diagram illustrating an example of a printed material on which the combined photograph is printed by the print unit 301 of the printer-equipped imaging apparatus 1. FIG. 7 illustrates a case where the text language is Japanese.

A printed material 401 illustrated in FIG. 7 is composed of a plurality of combined photographs. The printed material 401 is composed of five combined photographs (403, 405, 407. 409, and 411). Each combined photograph is composed of an image region P and a text region W. A text printed in the text region W is related to a captured image printed in the image region P. Furthermore, in a case where the combined photographs are continuously arranged as illustrated in FIG. 7, the printed material 401 can cause a person seeing the printed material 401 to recall a certain story in a case where the combined photographs are related to each other.

In the combined photograph 403, the image region P is disposed on the first page, and the text region W is disposed on the second page. That is, the print control unit 232 causes the print unit 301 to print the captured image and the text on different pages.

In addition, the printed material 401 is folded in an accordion shape. That is, the printed material 401 is formed in an accordion shape that has a valley fold on a line V and a mountain fold on a line M. By forming the printed material 401 in an accordion shape, a boundary between combined photographs or a boundary between the image region P and the text region W is clearly seen, and the printed material 401 can evoke storytelling for each page in the person seeing the printed material 401.

The printed material 401 printed by the printer-equipped imaging apparatus 1 according to the embodiment of the present invention includes a printed material that is composed of a single combined photograph.

Figure 8:
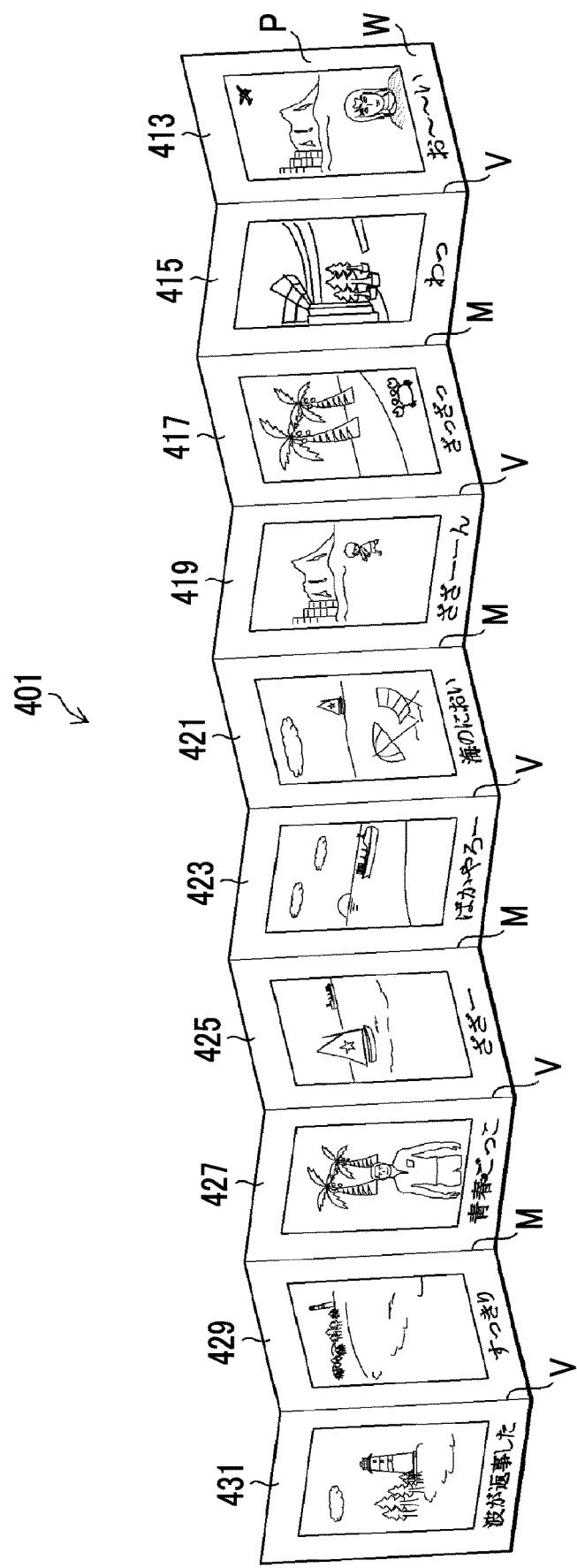
FIG. 8 is a diagram illustrating another example of the printed material.

FIG. 8 is a diagram illustrating another example of the printed material 401 printed by the print unit 301 of the printer-equipped imaging apparatus 1. FIG. 8 illustrates a case where the text language is Japanese.

The printed material 401 illustrated in FIG. 8 is composed of 10 combined photographs including a combined photograph 413, a combined photograph 415, a combined photograph 417, a combined photograph 419, a combined photograph 421, a combined photograph 423, a combined photograph 425, a combined photograph 427, a combined photograph 429, and a combined photograph 431. In the combined photograph 413 to the combined photograph 431, the image region P and the text region W are disposed on the same page. The print control unit 232 causes the print unit 301 to print the captured image and the text on the same page. The printed material 401 is formed in an accordion shape and has a valley fold on the line V and a mountain fold on the line M.

Figure 9:
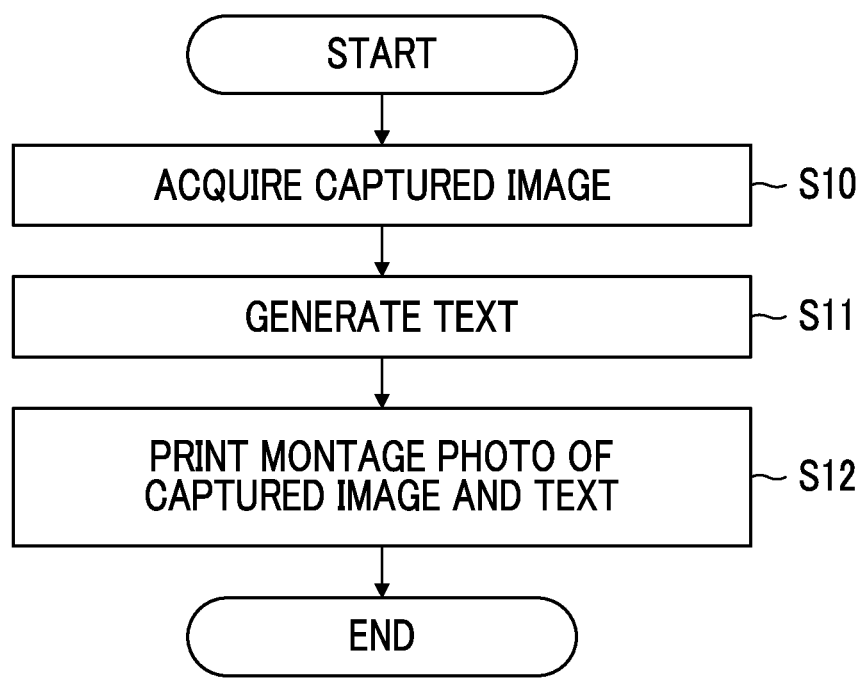
FIG. 9 is a flowchart illustrating an operation method of the imaging apparatus.

FIG. 9 is a flowchart illustrating an operation method of the printer-equipped imaging apparatus 1.

First, the printer-equipped imaging apparatus 1 acquires the captured image of the subject by the imaging unit 2 (step S10: imaging step). Next, the text is generated based on the sound acquired through the microphone 3, which the sound has been emitted by the subject or the sound around the subject (step S11: text generation step). The combined photograph of the captured image and the text is printed (step S12: print control step).

In the embodiment, a hardware structure of processing units executing various processes corresponds to various processors illustrated below. The various processors include a central processing unit (CPU) that is a general-purpose processor functioning as various processing units by executing software (program), a programmable logic device (PLD) such as a field programmable gate array (FPGA) that is a processor of which a circuit configuration can be changed after manufacturing, a dedicated electric circuit such as an application specific integrated circuit (ASIC) that is a processor having a circuit configuration dedicatedly designed to execute a specific process, and the like.

One processing unit may be formed of one of the various processors or may be formed of two or more processors of the same type or different types (for example, a plurality of FPGAs or a combination of a CPU and an FPGA). In addition, a plurality of processing units may be formed of one processor. As an example of configuring a plurality of processing units with one processor, a first form is configuring one processor with a combination of one or more CPUs and software and implementing a plurality of processing units by the processor as represented by a computer such as a client and a server. A second form is using a processor that implements the function of the whole system including a plurality of processing units by one integrated circuit (IC) chip as represented by a system on chip (SoC) and the like. Various processing units are configured using one or more of the various processors as a hardware structure.

Furthermore, the hardware structure of the various processors is more specifically an electric circuit (circuitry) in which circuit elements such as semiconductor elements are combined.

Each configuration and each function described above can be appropriately implemented by any hardware, software, or a combination of both hardware and software. For example, the present invention can also be applied to a program that causes a computer to execute the process steps (process procedure) described above, a computer-readable recording medium (non-transitory recording medium) on which the program is recorded, or a computer on which the program can be installed.

Second Embodiment

Next, a second embodiment of the present invention will be described. FIG. 10 is a diagram illustrating a function block diagram of the printer-equipped imaging apparatus 1 of the present embodiment. The same parts as FIG. 6 will be designated by the same reference signs, and descriptions of such parts will not be repeated.

The printer-equipped imaging apparatus 1 of the present embodiment is formed of the imaging unit 2, the microphone 3, the text generation unit 230, the storage unit 303, the print control unit 232, the print unit 301, the image analysis unit 305, the display control unit 246, the display unit 22, and a printed text selection unit 307.

The image analysis unit 305 performs the image analysis on the captured image acquired by the imaging unit 2. The image analysis unit 305 analyzes the captured image using a well-known technology. In addition, the image analysis unit 305 performs the image analysis on the live view image acquired by the imaging unit 2.

The text generation unit 230 of the present embodiment generates the text based on the result of the image analysis of the image analysis unit 305. For example, the text generation unit 230 generates the text related to the subject captured in the captured image as a result of the image analysis. The text generation unit 230 may generate the text based on the result of the image analysis obtained by analyzing the live view image acquired by the imaging unit 2 in the image analysis unit 305.

In addition, the text generation unit 230 decides the text size or the text type of the generated text based on the result of the image analysis of the captured image. The text size means the size of the text. For example, a text that is generated with respect to a main subject as a result of the image analysis is generated in a large size. The text type refers to the type of font of the text such as Mincho font or Gothic font. The text type may be changed based on the result of the image analysis.

The display control unit 246 displays the text generated by the text generation unit 230 on the display unit 22. The display control unit 246 may generate an animation composed of the text generated by the text generation unit 230 and display the animation on the display unit 22. The animation is a display form that accompanies a motion such as movement of the text on the display unit or deformation of the text.

The display unit 22 is disposed in the casing 1a of the printer-equipped imaging apparatus 1. As described above, the display unit 22 is formed of the plurality of display units 22a, 22b, and 22c. The text generated by the text generation unit 230 or the animation is displayed on each display unit (22a, 22b, and 22c). The print control unit 232 prints the combined photograph of the text and the captured image displayed on the display unit 22. The display unit 22 is disposed on the front surface of the casing 1a. The user who faces the front surface of the printer-equipped imaging apparatus 1 sees the text as being displayed on the casing 1a. Accordingly, the design of the printer-equipped imaging apparatus 1 can he improved.

The printed text selection unit 307 selects a text to be printed by the print unit 301 from the text displayed on the display unit 22. For example, the printed text selection unit 307 is implemented by the system controller 240. The text selected by the printed text selection unit 307 is printed by the print unit 301.

The printed text selection unit 307 automatically selects the text to be printed by the print unit 301. For example, the printed text selection unit 307 selects the text to be printed based on information in the generation of the text by the text generation unit 230. Specifically, the text is selected by the text generation unit 230 based on a preset priority and information from the text generation unit 230. The printed text selection unit 307 may select the text based on the analysis result of the image analysis unit 305. For example, the printed text selection unit 307 selects a text that is most related to the main subject as a result of the image analysis.

[Display on Casing and Printing Form]

Next, one form of the display of the text generated by the text generation unit 230 and printing of the displayed text in the present embodiment will be described.

Figure 11:
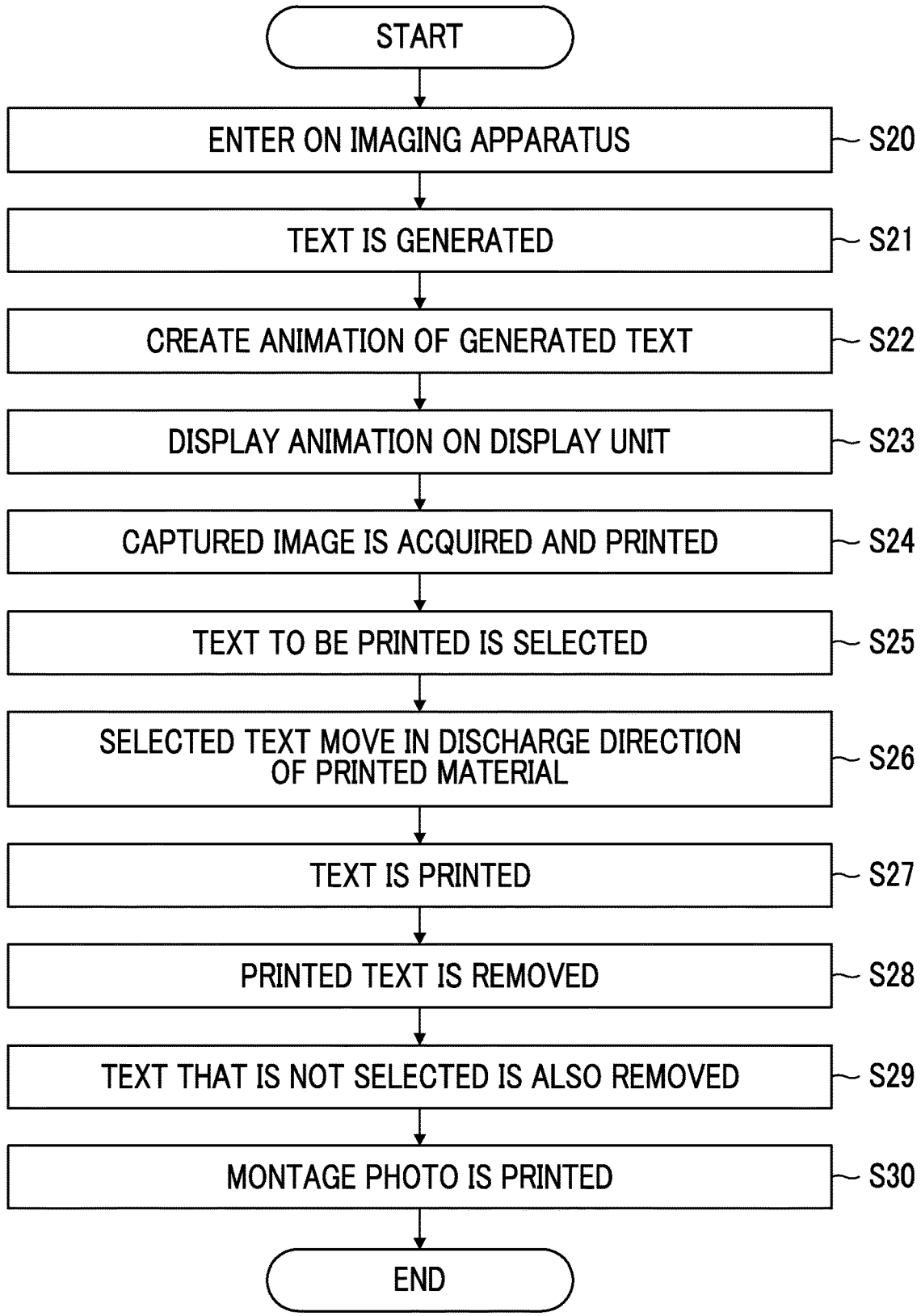
FIG. 11 is a flowchart illustrating an operation of printing a text.

FIG. 11 is a flowchart illustrating an operation of printing the text displayed on the display unit 22. FIG. 12 to FIG. 15 are diagrams illustrating one form of the display of the text on the display unit 22 and a print operation in the print unit 301. FIG. 12 to FIG. 15 illustrates a case where the text language is Japanese.

First, the power supply of the printer-equipped imaging apparatus 1 enters an ON state (step S20). Accordingly, the microphone 3 is started, and the microphone 3 starts collecting the sound. The microphone 3 collects the sound at all times in the ON state of the power supply. In addition, in a case where the power supply of the printer-equipped imaging apparatus 1 is switched ON, the imaging unit 2 is started, and the live view image is acquired. The imaging unit 2 acquires the live view image at all times in the ON state of the power supply.

Next, the text is generated by the text generation unit 230 based on the collected sound collection result (step S21). In addition, the text is generated by the text generation unit 230 based on the acquired live view image (step S21). The animation of the generated text is created by the display control unit 246 (step S22). Then, the generated animation is displayed on the display unit 22 by the display control unit 246 (step S23).

Figure 12:
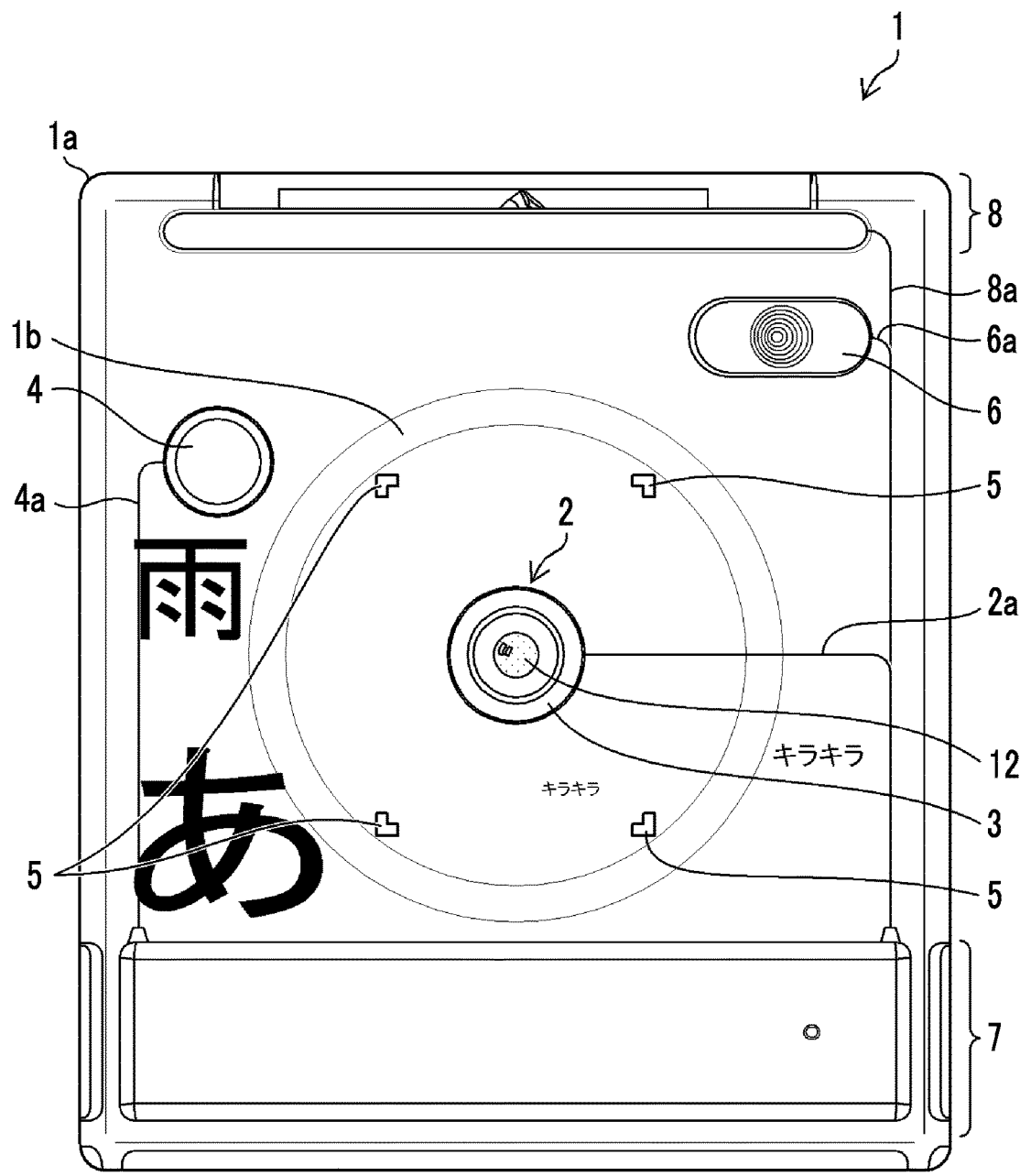
FIG. 12 is a diagram illustrating an example of a text displayed on a display unit.

FIG. 12 is a diagram illustrating an example of the text displayed on the display unit 22 by the display control unit 246. For example, audio of a person corresponding to "h" is picked up by the microphone 3, the text displayed on the display unit 22 is generated as a text "h" by the text generation unit 230. The generated text "h" is displayed on the display unit 22 by an animation that moves in the +direction of an X axis in FIG. 12.

In addition, for example, in a case where rain is detected by analyzing the live view image, a text "rain" is generated, and an animation that moves in the "+" direction of the X axis is generated in the same manner.

Furthermore, in a case where light shines in the captured image by analyzing the live view image, a text "sparkle" is generated, and an animation that moves in the "−"direction of the X axis is generated.

Next, the captured image is acquired by the imaging unit 2. Specifically, the captured image is acquired by pushing the shutter release switch 4 by the user (step S24). The captured image is printed by the print unit 301 (FIG. 11).

Figure 13:
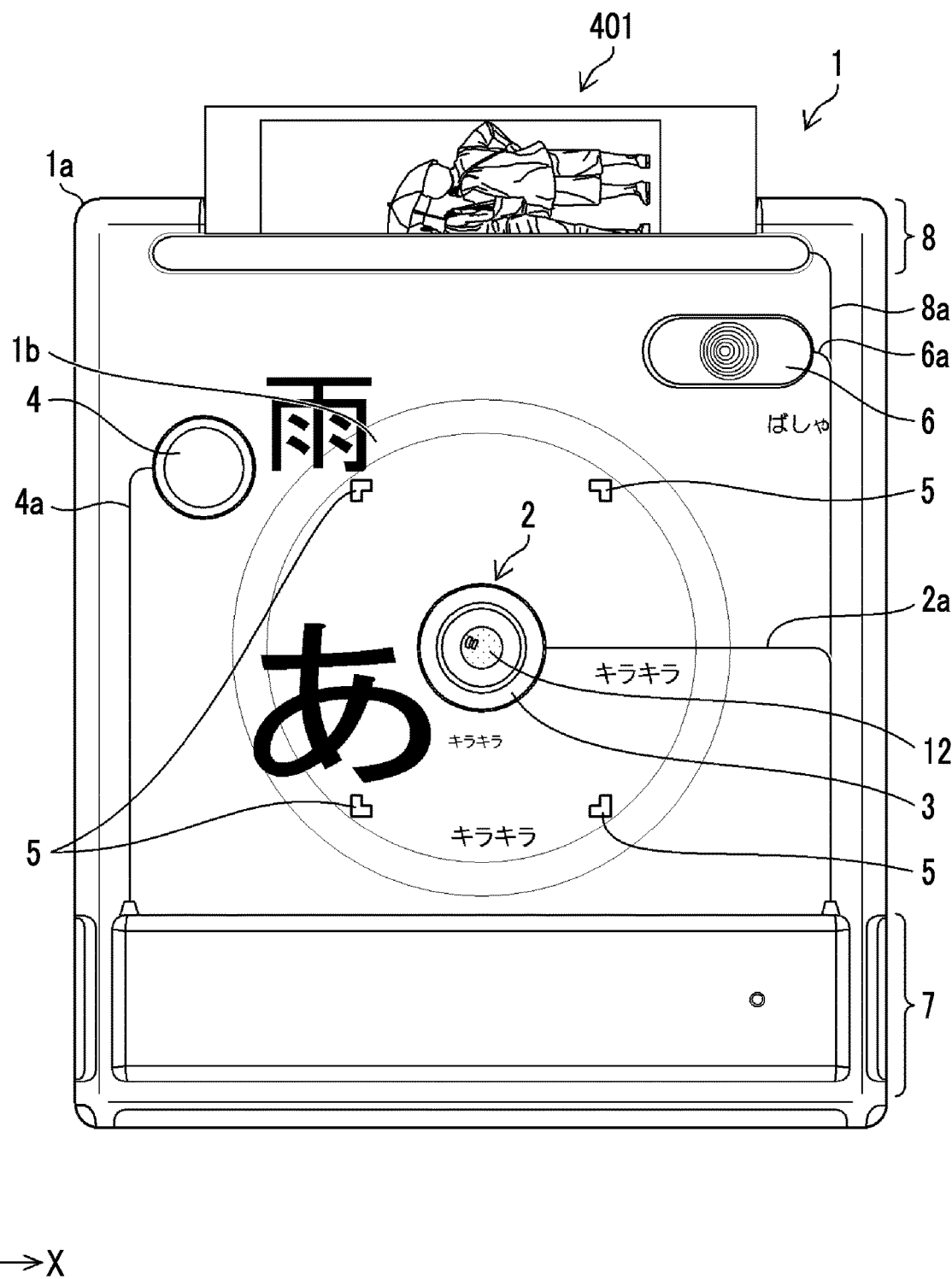
FIG. 13 is a diagram illustrating a state where a captured image is printed.

FIG. 13 is a diagram illustrating a state where the captured image is printed. The print control unit 232 causes the print unit 301 to print the acquired captured image, and the printed material 401 is discharged. In a case where the captured image is printed, the display of the animation continues on the display unit 22. That is, "h" and "rain" move like flowing in the "+" direction of the X axis, and "sparkle" moves like flowing in the "−" direction of the X axis.

Next, the text to be printed is automatically selected by the printed text selection unit 307 (step S25). The selected text moves in the discharge direction of the printed material 401 (step S26). That is, the display control unit 246 displays an animation in which the text displayed on the display unit 22 moves depending on the print operation of the print unit 301. For example, the display control unit 246 moves the text in the discharge direction of the printed material 401 discharged from the print unit 301 and removes the text in response to the discharge of the printed material 401 (FIG. 11).

Figure 14:
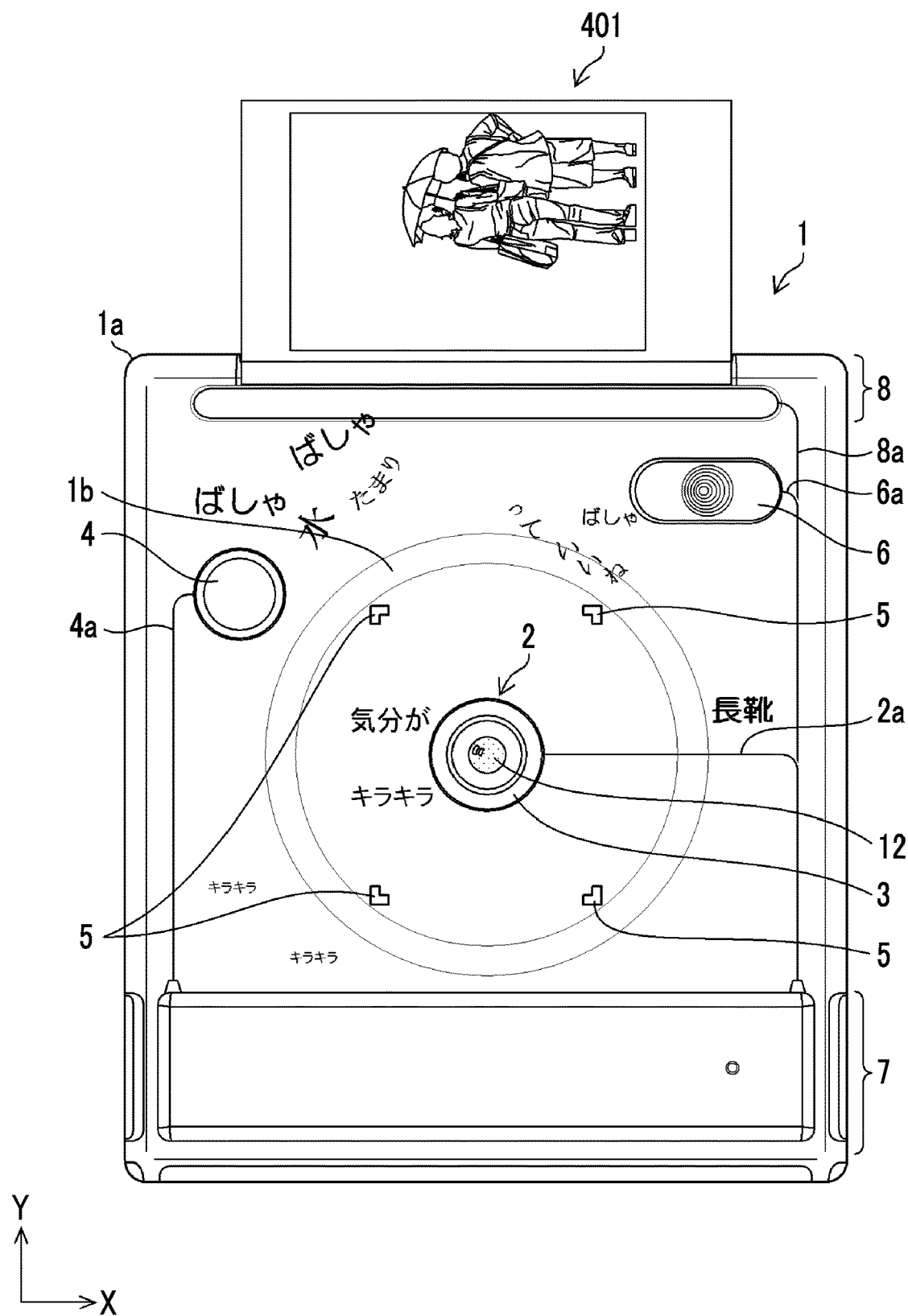
FIG. 14 is a diagram illustrating an animation.

FIG. 14 is a diagram illustrating an animation in which the text selected from the text displayed on the display unit 22 by the printed text selection unit 307 moves in the discharge direction. The selected text moves in the "+" direction of a Y axis in FIG. 14. That is, the display control unit 246 moves the text in a direction perpendicular to the discharge direction of the printed material 401 of the print unit 301, and moves only the text selected by the printed text selection unit 307 in the discharge direction of the printed material 401. Specifically, the text related to the main subject of the captured image is selected and printed based on the result of the image analysis of the captured image.

Next, the selected text is printed (step S27). The printed text is removed from the display unit 22 in synchronization with the printing (step S28) (FIG. 11).

Figure 15:
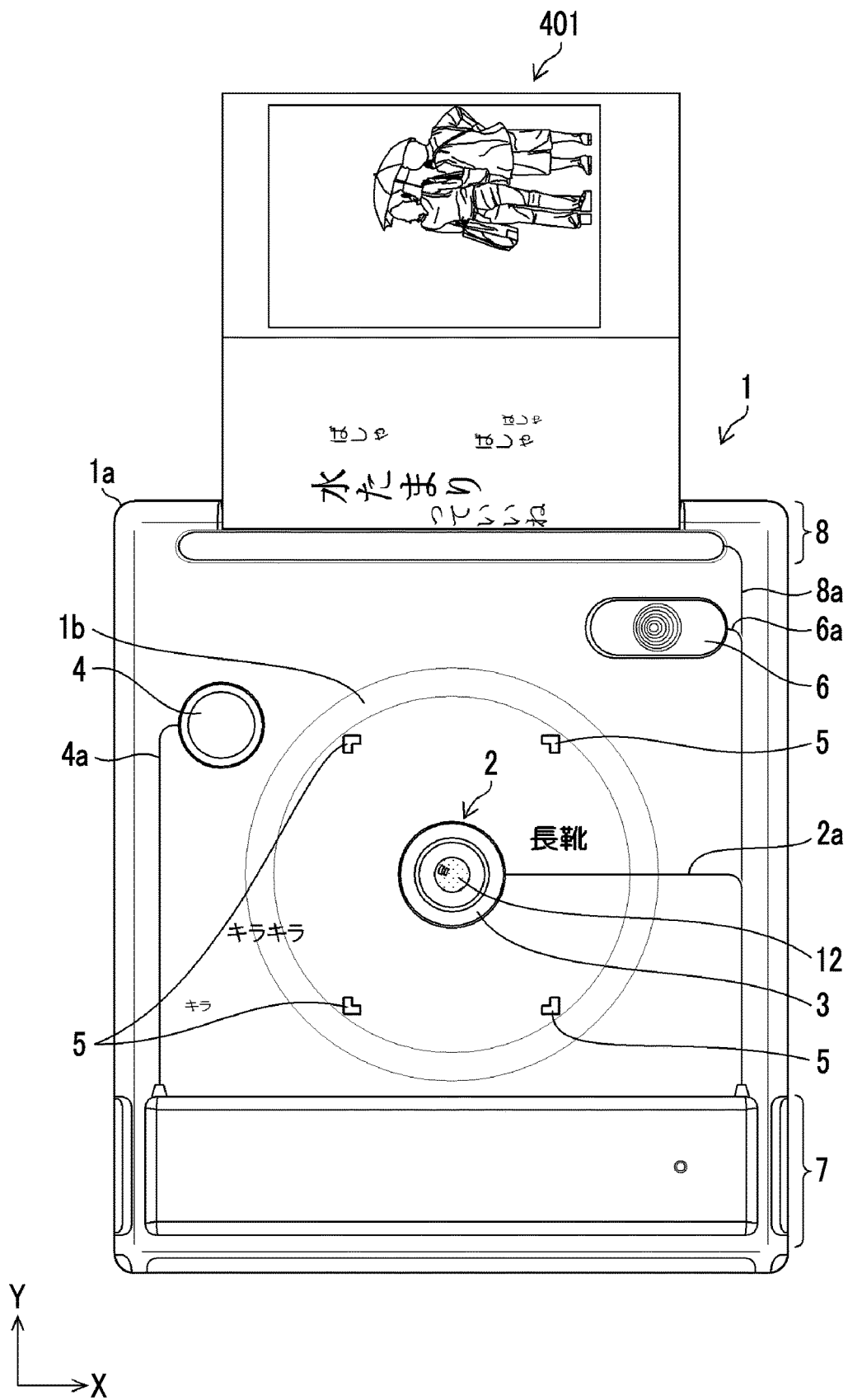
FIG. 15 is a diagram illustrating a state where the text displayed in synchronization with printing is removed from the display unit.

FIG. 15 is a diagram illustrating a state where the selected text (text that moves in the discharge direction of the printed material 401) is printed and the text displayed in synchronization with the printing is removed from the display unit 22. A text that is not selected is displayed on the display unit 22 and continues moving.

Next, a text that is displayed and is not printed is also removed (step S29), and the combined photograph composed of the image and the text is printed (step S30) (FIG. 11).

Figure 16:
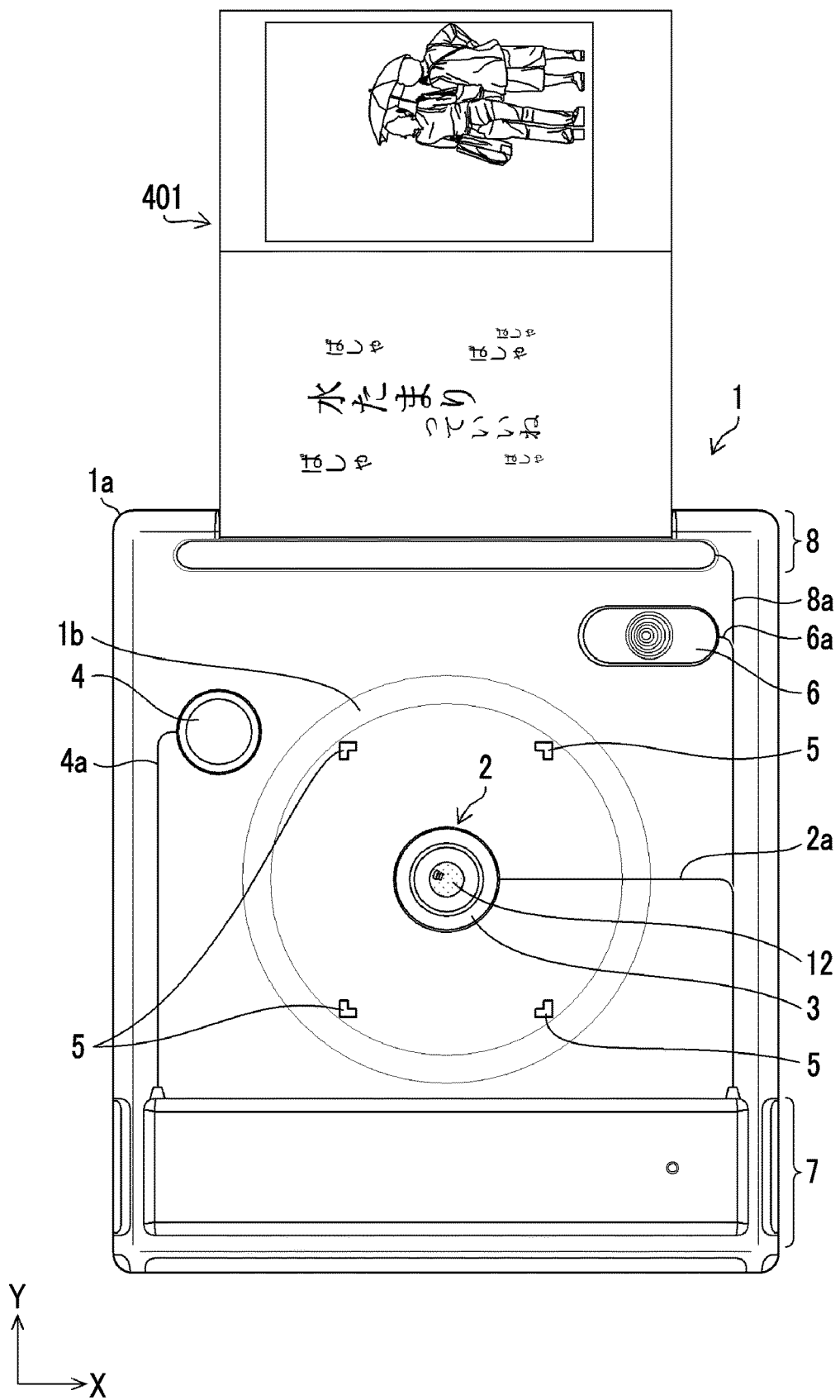
FIG. 16 is a diagram illustrating completion of printing of one combined photograph and removal of the text displayed on the display unit.

FIG. 16 is a diagram illustrating completion of printing of one combined photograph and removal of the text displayed on the display unit 22. For example, in a case where the printer-equipped imaging apparatus 1 prints one combined photograph, the text displayed on the display unit 22 is removed in response to the completion of the printing of the combined photograph. FIG. 16 illustrates a case where the text language is Japanese.

Figure 17:
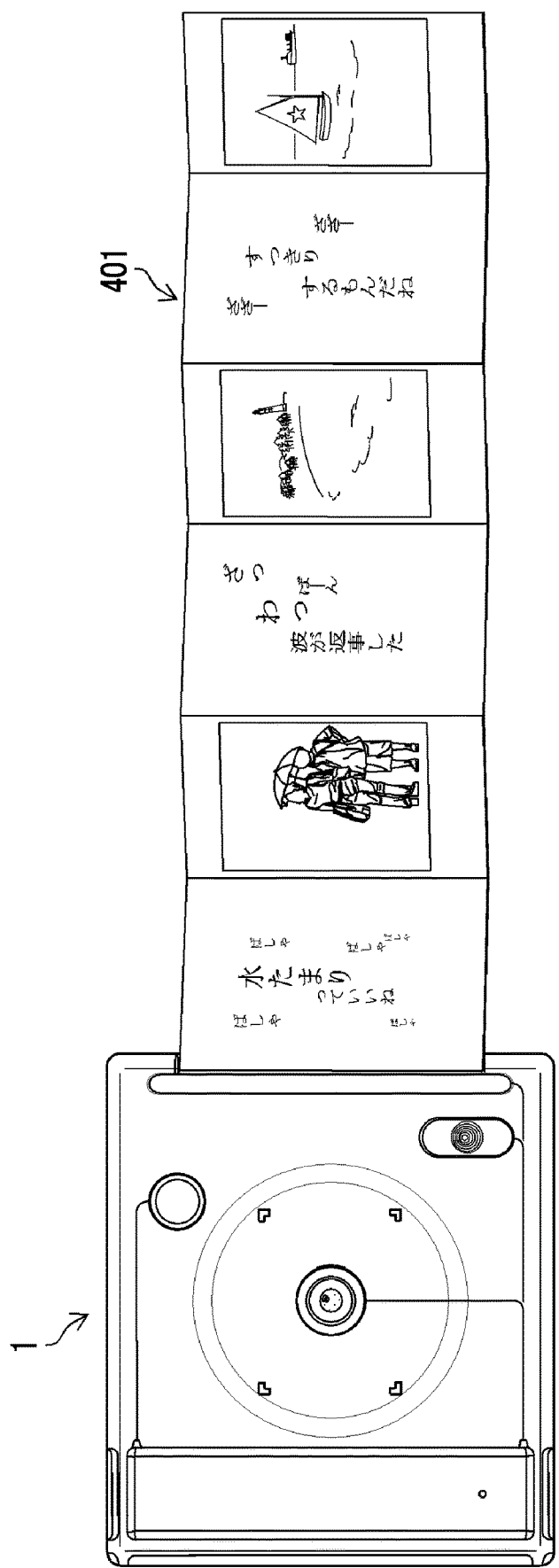
FIG. 17 is a diagram illustrating a state where a print of a plurality of consecutive combined photographs is discharged.

FIG. 17 is a diagram illustrating a state where a print of a plurality of consecutive combined photographs is discharged. In the case illustrated in FIG. 17, printing of the first and second combined photographs is completed, and the text region of the third combined photograph is printed. The accordion shape of the printed material 401 may be formed by a folding formation mechanism (not illustrated) disposed in the printer-equipped imaging apparatus 1 at the time of discharging the printed material 401, or may be formed after the printed material 401 in which a fold is not formed is discharged. FIG. 17 illustrates a case where the text language is Japanese.

[Example of Transport of Print Paper]

Figure 18:
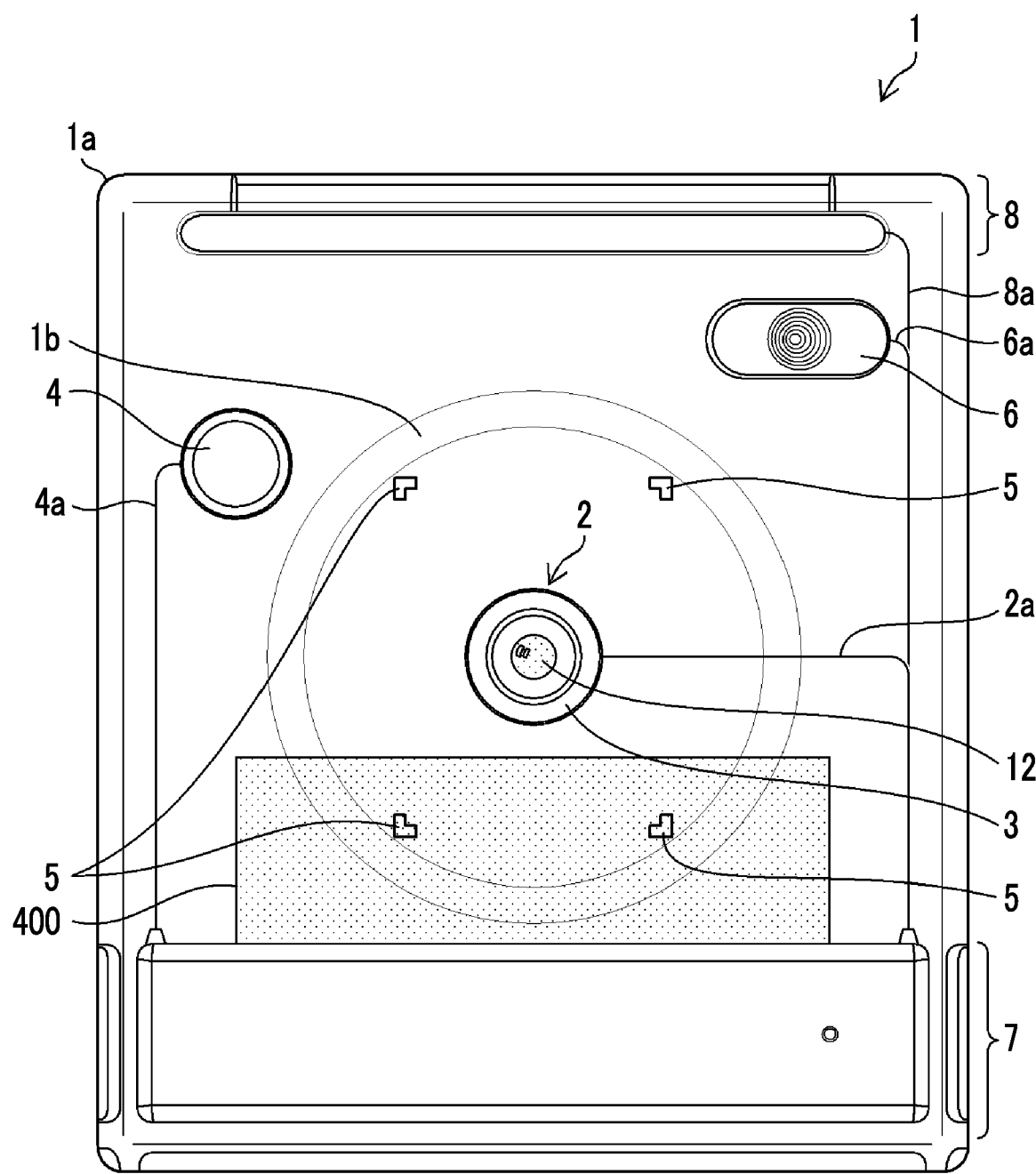
FIG. 18 is a diagram illustrating a state where print paper is transported.
Figure 19:
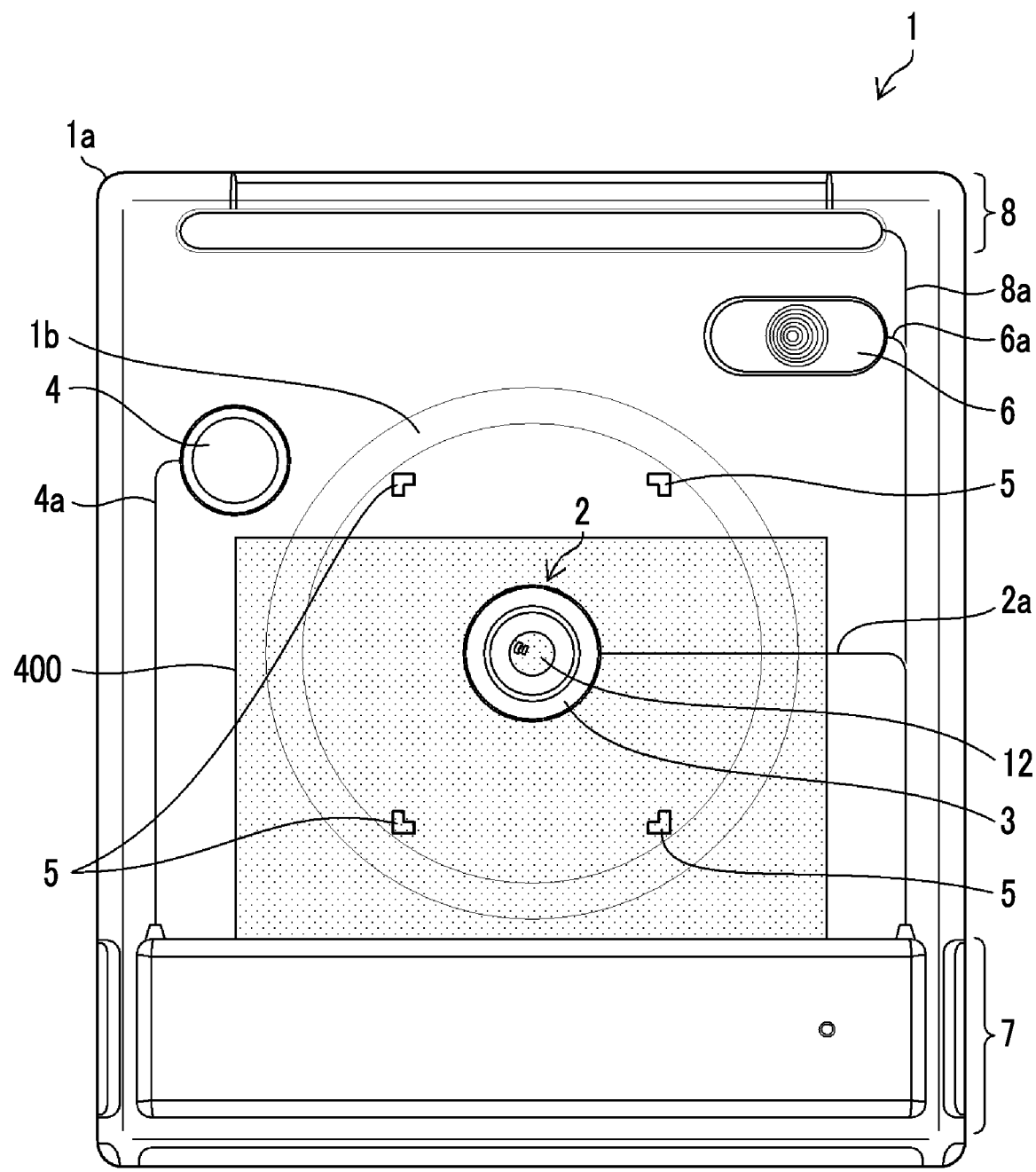
FIG. 19 is a diagram illustrating a state where the print paper is transported.
Figure 20:
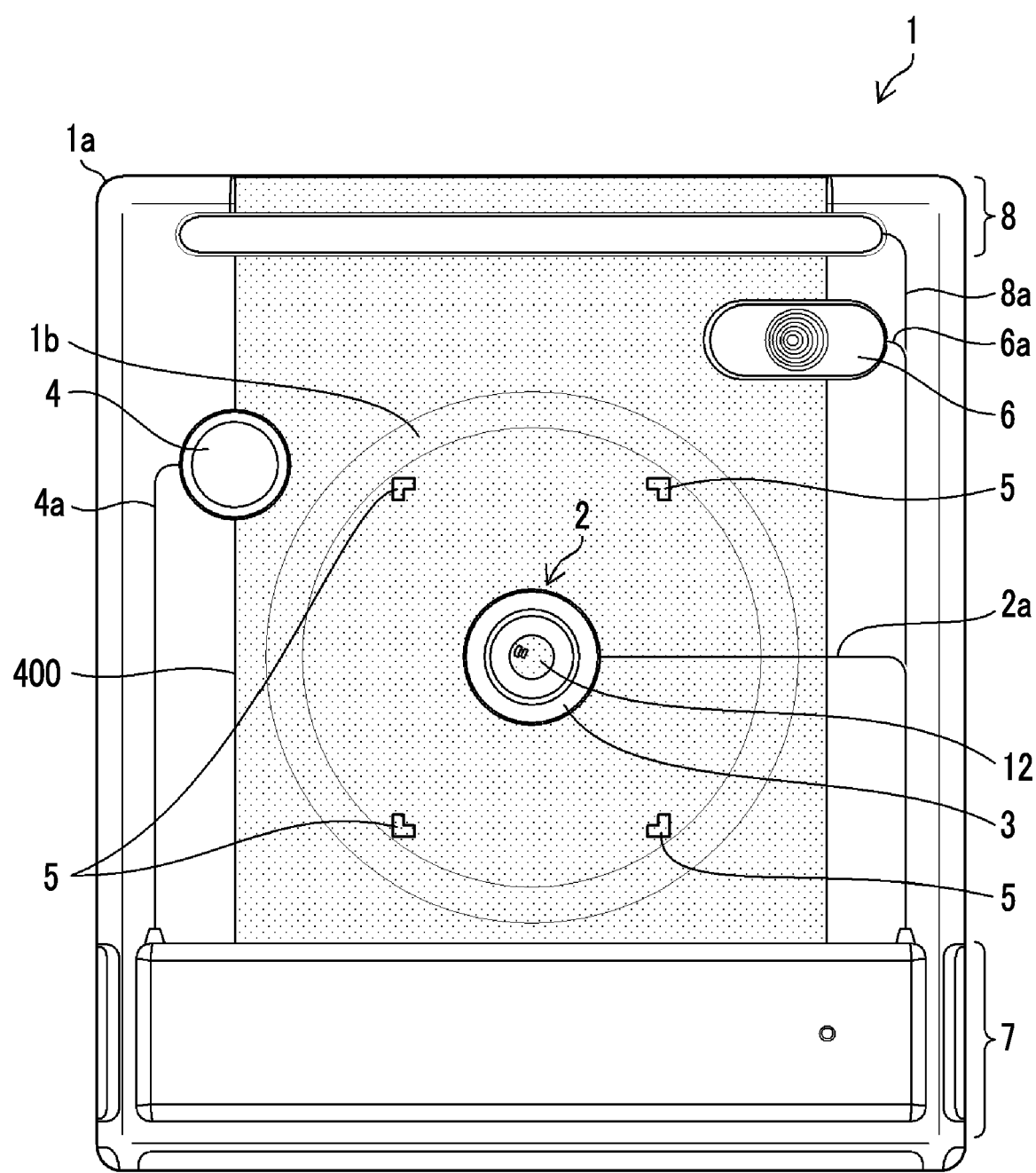
FIG. 20 is a diagram illustrating a state where the print paper is transported.

Next, one form of transport of the print paper in the case of printing by the print unit 301 will be described. FIG. 18 to FIG. 20 are diagrams illustrating a state where the print paper is transported.

FIG. 18 is a diagram illustrating the initial stage of transport of print paper 400. The print paper 400 is stored in the first content 7 by winding the print paper 400 in a roll shape and accommodating the print paper 400 in a cartridge. The stored print paper 400 is dispensed from the cartridge by rotating the shaft of the cartridge. A guide unit (not illustrated) for the print paper 400 is disposed on both sides of the casing 1*a* of the printer-equipped imaging apparatus 1. The dispensed print paper 400 is transported to the second content 8 along the guide unit.

FIG. 19 illustrates the intermediate stage of the transport of the print paper 400. The print paper 400 in the roll shape is moved upward along the guide unit by the shaft of the cartridge. As described above, the casing 1*a* is made of a transparent resin. Thus, the transport of the print paper 400 is observed through the casing 1*a*. Accordingly, an improvement in design of the printer-equipped imaging apparatus 1 can be expected.

FIG. 20 illustrates the last stage of the transport of the print paper 400. The print paper 400 in the roll shape is transported along the guide unit and reaches the second content 8 by the shaft of the cartridge. The print paper 400 that reaches the second content 8 is transported by the prim paper transport mechanism 54 of the second content 8. In a case where the print paper 400 reaches the print paper transport mechanism 54, the print paper transport mechanism 54 controls the speed of the transport.

In a case where the printing by the print unit 301 is finished, for example, the print paper 400 is wound into a roll shape by rotating the shaft of the cartridge in the opposite direction to the case where the print paper 400 is dispensed. In addition, in a case where the printing of the print unit 301 is finished, the print paper 400 may be ready for the subsequent printing in a state where the print paper 400 reaches the print paper transport mechanism 54.

Figure 21:
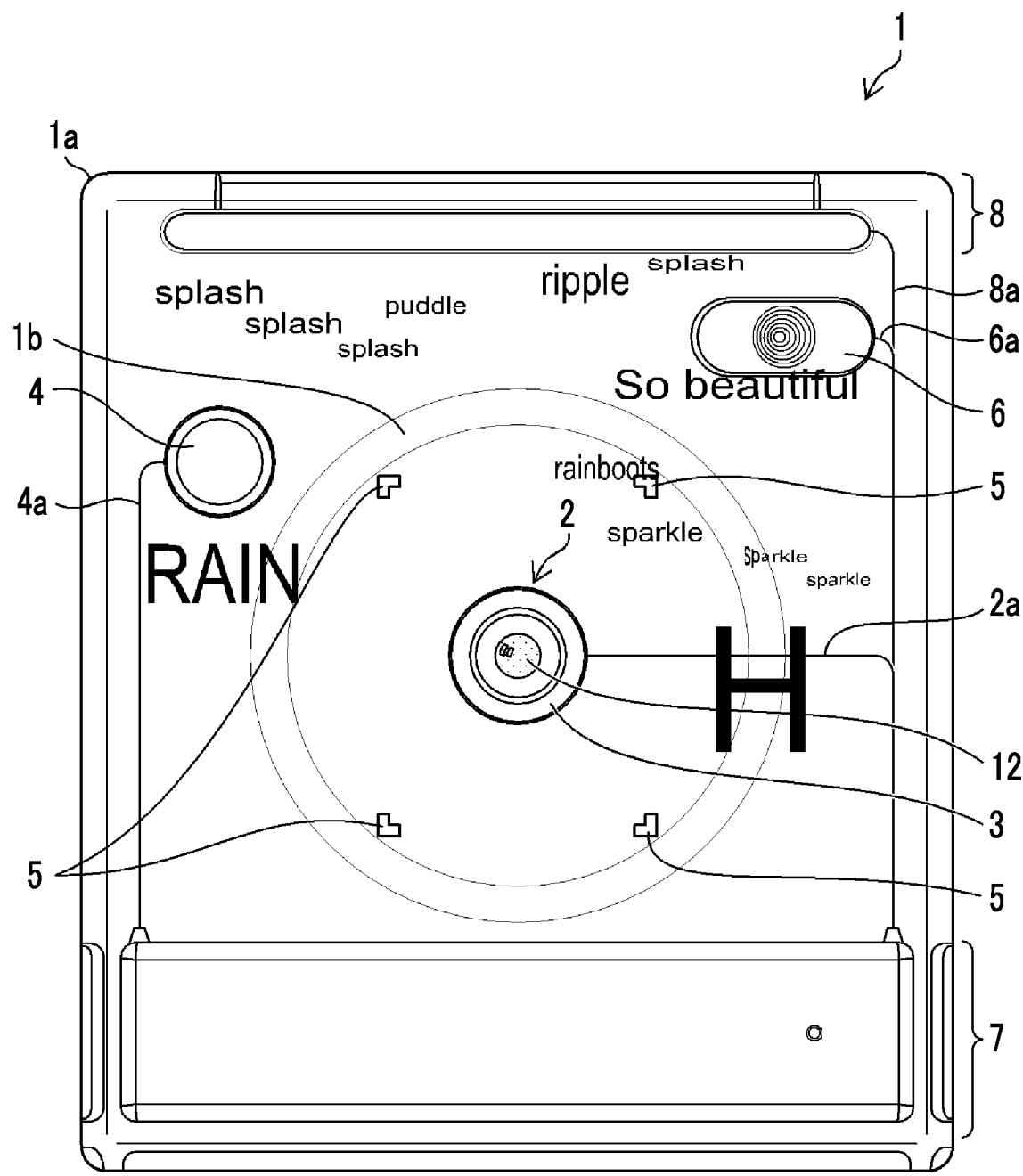
FIG. 21 is a front view of the printer-equipped imaging apparatus illustrated in FIG. 1 and is particularly a diagram illustrating a state where an English text is displayed on an apparatus main body.
Figure 22:
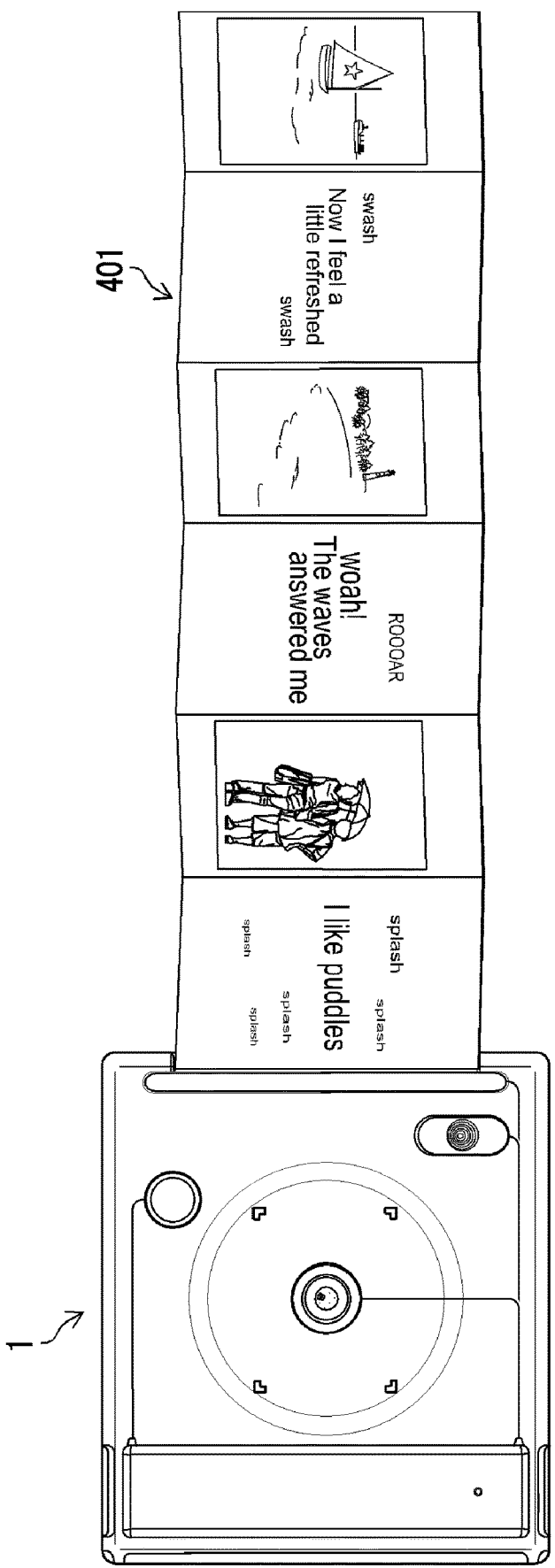
FIG. 22 is a diagram illustrating a state where the print illustrated in FIG. 17 is discharged and is particularly a diagram illustrating a state where a print of a plurality of combined photographs in which images are combined with English texts is discharged.

In addition, as described above, in a case where a specific text language (for example, English) is selected by the language selection unit, the text generation unit 230 can generate an English text language from the selected English audio language. The display control unit 246 displays an English text on the display unit 22 as illustrated in FIG. 21 based on the generated English text language. Furthermore, in a case where the English text language is generated, the print control unit 232 causes the print unit 301 to print a combined photograph in which the image and the English text are combined as illustrated in FIG. 22.

While examples of the present invention are described thus far, the present invention is not limited to the embodiments. Various modifications can be made without departing from the spirit of the present invention.

EXPLANATION OF REFERENCES

1: printer-equipped imaging apparatus
1*a*: casing
1*b*: protruding portion
2: imaging unit
8*a*: wire
3: microphone
4: shutter release switch
4*a*: wire
5: finder frame
6: flash light emission unit
6*a*: wire
7: first content
8: second content
12: imaging lens
18*a*: stop
18*b*: shutter
22: display unit
42: image sensor
54: print paper transport mechanism
56: print head
212: imaging lens drive unit
214: image sensor drive unit
216: analog signal processing unit
218: image data input unit
220: digital signal processing unit
222: internal memory
230: text generation unit
232: print control unit 234: print paper transport mechanism drive unit
236: print head drive unit
240: system controller
242: work memory
244: data memory
246: display control unit
247: microphone drive unit
248: operation unit
249: flash control unit
250: power supply unit
301: print unit
303: storage unit
305: image analysis unit
307: printed text selection unit
400: print paper
401: printed material
steps S10 to S12: operation step for printer-equipped imaging apparatus
steps S20 to S30: printing step for displayed text

What is claimed is:

1. A printer-equipped imaging apparatus comprising:
an imaging unit that acquires a captured image of a subject;
a text generation unit that generates a text based on a sound emitted by the subject or a sound around the subject;
a print unit that prints the captured image acquired by the imaging unit and the text generated by the text generation unit, the print unit printing a combined photograph of the captured image and the text; and
a print control unit that causes the print unit to print the combined photograph,
wherein the print control unit causes the print unit to print the captured image and the text on different pages, and
wherein in a case where the print unit performs a print operation, the imaging unit stops the acquisition of the captured image.

2. The printer-equipped imaging apparatus according to claim 1,
wherein the print control unit causes the print unit to print a plurality of the combined photographs.

3. The printer-equipped imaging apparatus according to claim 1, further comprising:
a sound collection unit that acquires the sound emitted by the subject or the sound around the subject,
wherein the text generation unit generates the text based on the sound acquired by the sound collection unit.

4. The printer-equipped imaging apparatus according to claim 1, further comprising:
an image analysis unit that performs image analysis on the captured image acquired by the imaging unit,
wherein the text generation unit generates the text based on a result of the image analysis of the image analysis unit.

5. The printer-equipped imaging apparatus according to claim 4,
wherein the text generation unit decides a text size or a text type of the text to be generated and generates the text based on the result of the image analysis of the image analysis unit.

6. The printer-equipped imaging apparatus according to claim 1, further comprising:
a storage unit that stores the captured image captured by the imaging unit and the text generated by the text generation unit,
wherein the print control unit causes the print unit to print the captured image and the text stored in the storage unit.

7. The printer-equipped imaging apparatus according to claim 1, further comprising:
a display unit that is disposed in a casing of the printer-equipped imaging apparatus; and
a display control unit that displays the text generated by the text generation unit on the display unit,
wherein the print control unit causes the print unit to print the combined photograph of the text displayed on the display unit and the captured image.

8. The printer-equipped imaging apparatus according to claim 7,
wherein the display control unit displays an animation composed of the text generated by the text generation unit on the display unit.

9. The printer-equipped imaging apparatus according to claim 8,
wherein the display control unit displays the animation in which the text displayed on the display unit is moved depending on a print operation of the print unit.

10. The printer-equipped imaging apparatus according to claim 9,
wherein the display control unit moves the text in a discharge direction of a printed material discharged from the print unit, and removes the text in response to the discharge of the printed material.

11. The printer-equipped imaging apparatus according to claim 7, further comprising:
a printed text selection unit that selects the text to be printed by the print unit from the text generated by the text generation unit,
wherein the print unit prints the text selected by the printed text selection unit.

12. The printer-equipped imaging apparatus according to claim 11,
wherein the display control unit moves the text in a direction perpendicular to a discharge direction of a printed material of the print unit, and moves only the text selected by the printed text selection unit in the discharge direction of the printed material.

13. The printer-equipped imaging apparatus according to claim 7,
wherein the display unit is disposed on at least a front surface of the casing.

14. An operation method of a printer-equipped imaging apparatus, the method comprising:
an imaging step of acquiring a captured image of a subject;
a text generation step of generating a text based on a sound emitted by the subject or a sound around the subject; and
a print control step of causing a print unit that prints the captured image acquired in the imaging step and the text generated in the text generation step to print a combined photograph of the captured image and the text,
wherein the print control step includes a step of causing the print unit to print the captured image and the text on different pages, and
wherein in a case where the print unit performs a print operation, the imaging step stops the acquisition of the captured image.

15. A non-transitory computer-readable recording medium in which a program is stored, the program causing a computer of a printer-equipped imaging apparatus to execute:
- an imaging step of acquiring a captured image of a subject;
- a text generation step of generating a text based on a sound emitted by the subject or a sound around the subject; and
- a print control step of causing a print unit that prints the captured image acquired in the imaging step and the text generated in the text generation step to print a combined photograph of the captured image and the text,
- wherein the print control step includes a step of causing the print unit to print the captured image and the text on different pages, and
- wherein in a case where the print unit performs a print operation, the imaging step stops the acquisition of the captured image.

* * * * *